United States Patent Office 3,025,723
Patented Mar. 20, 1962

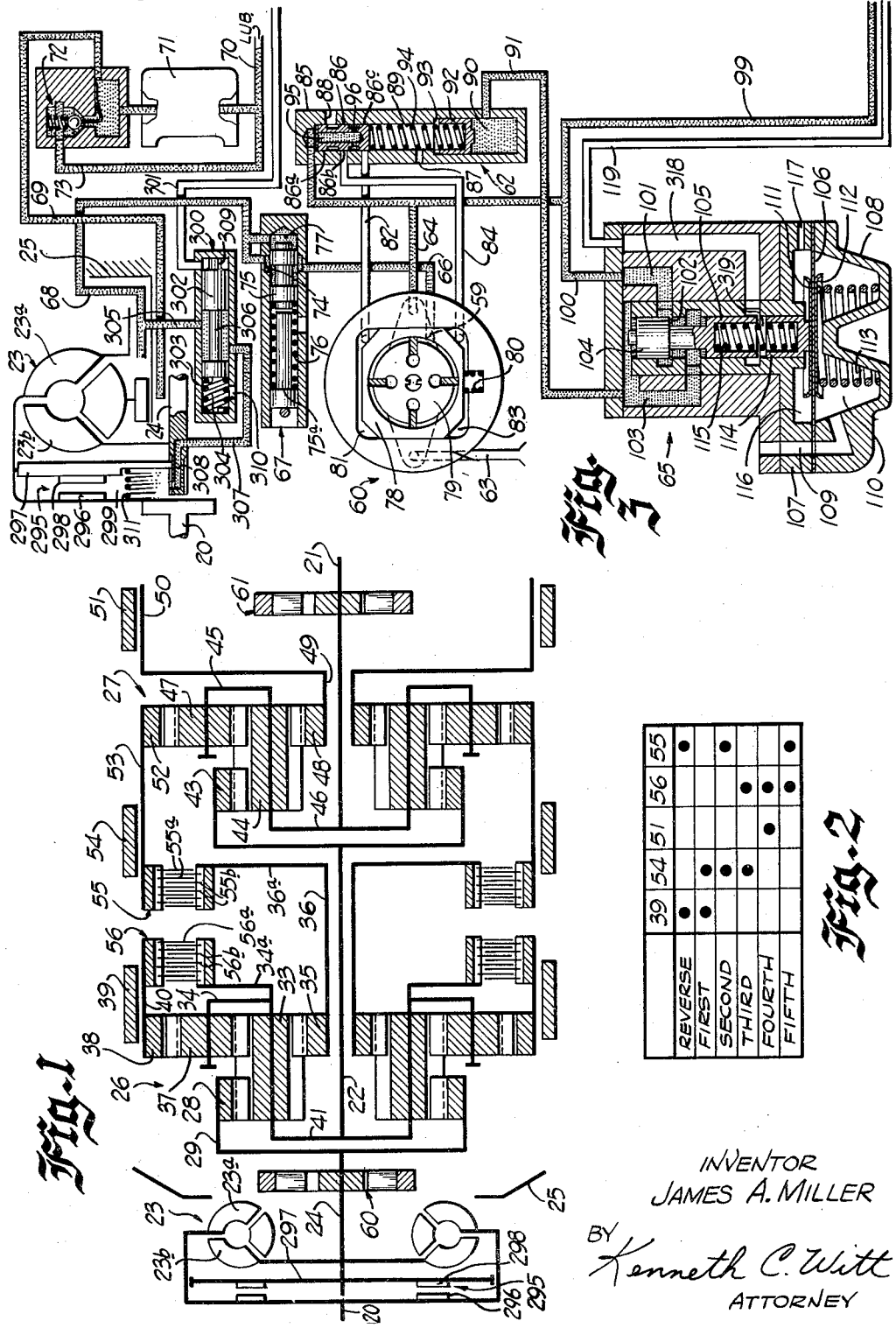

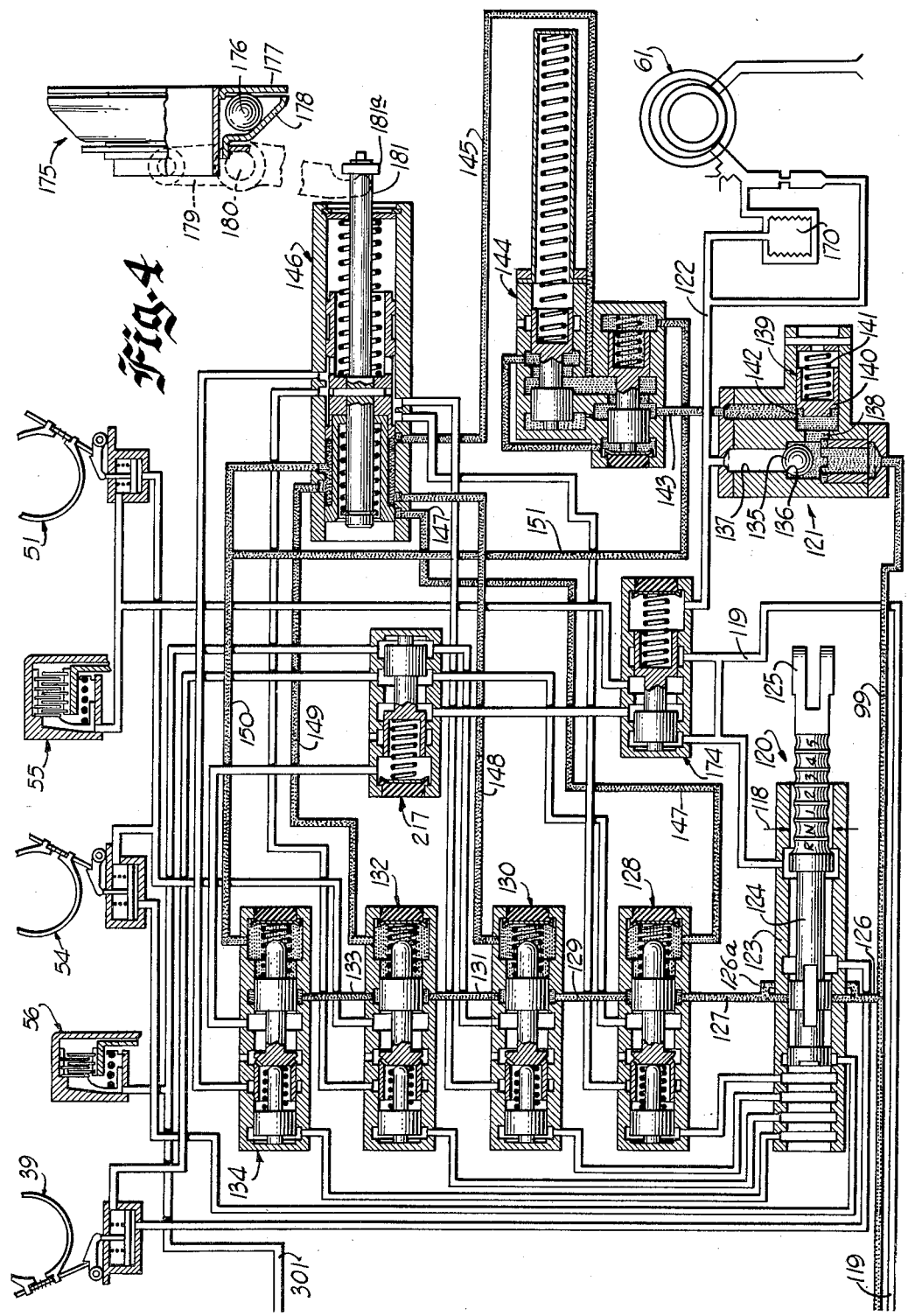

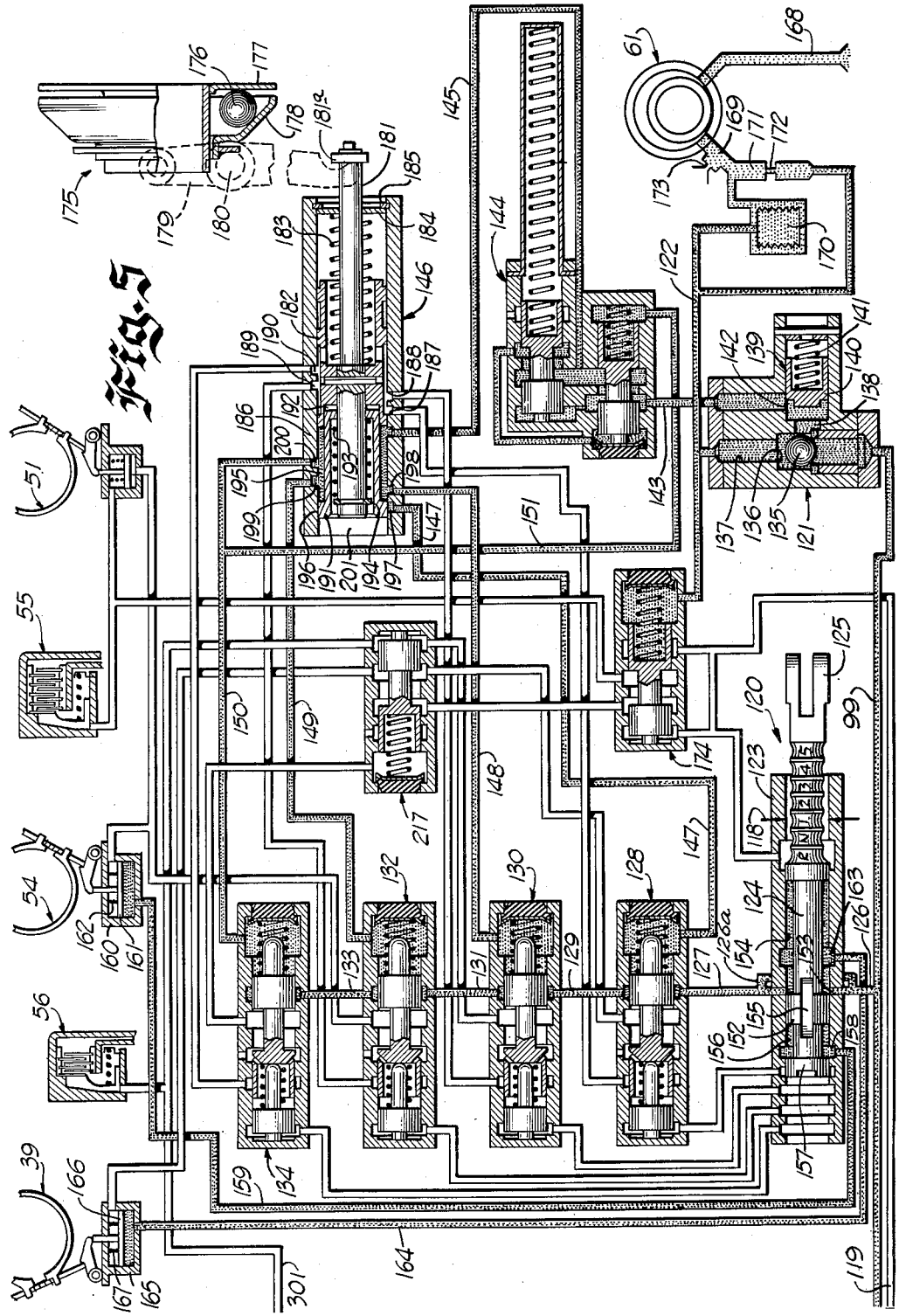

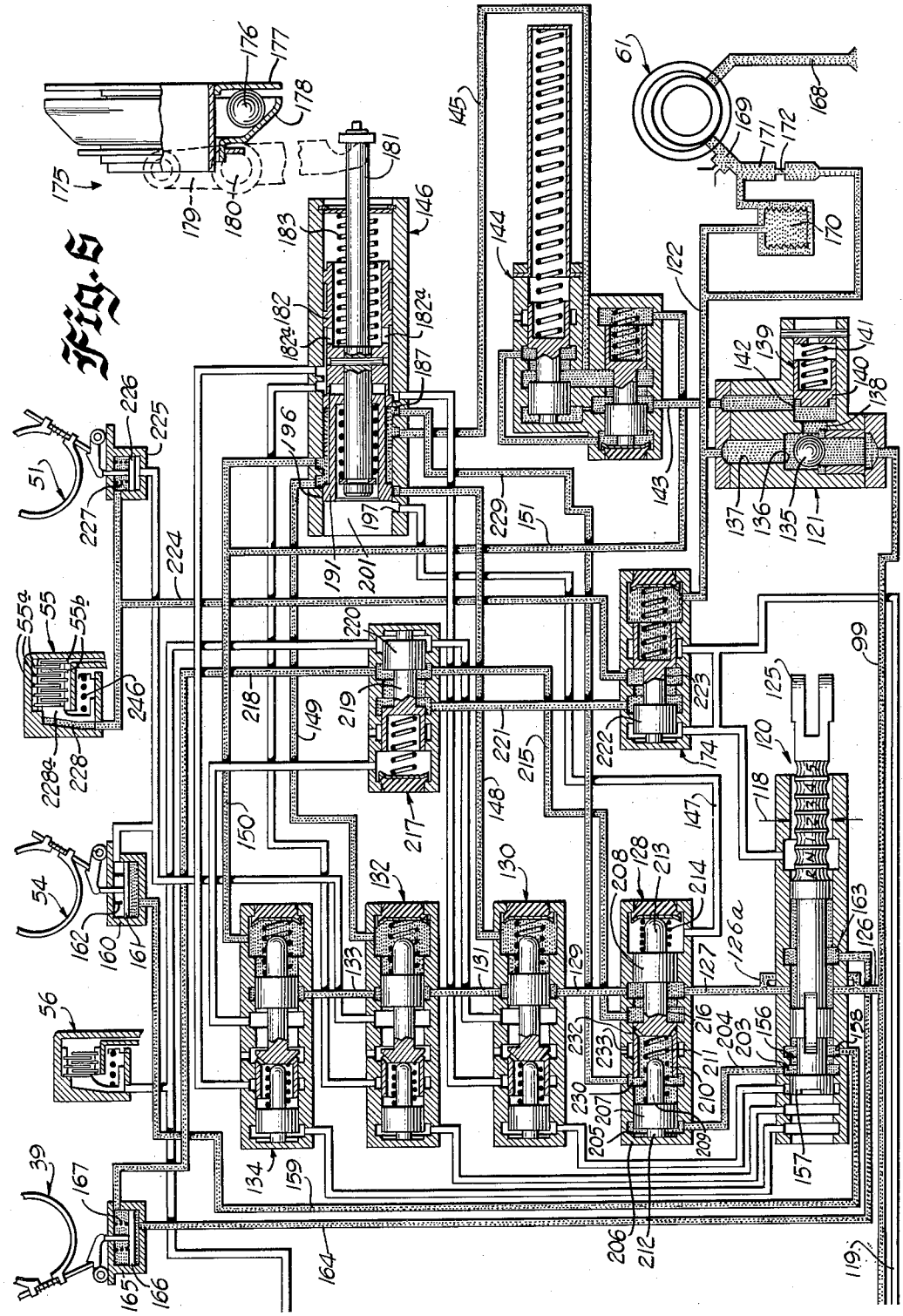

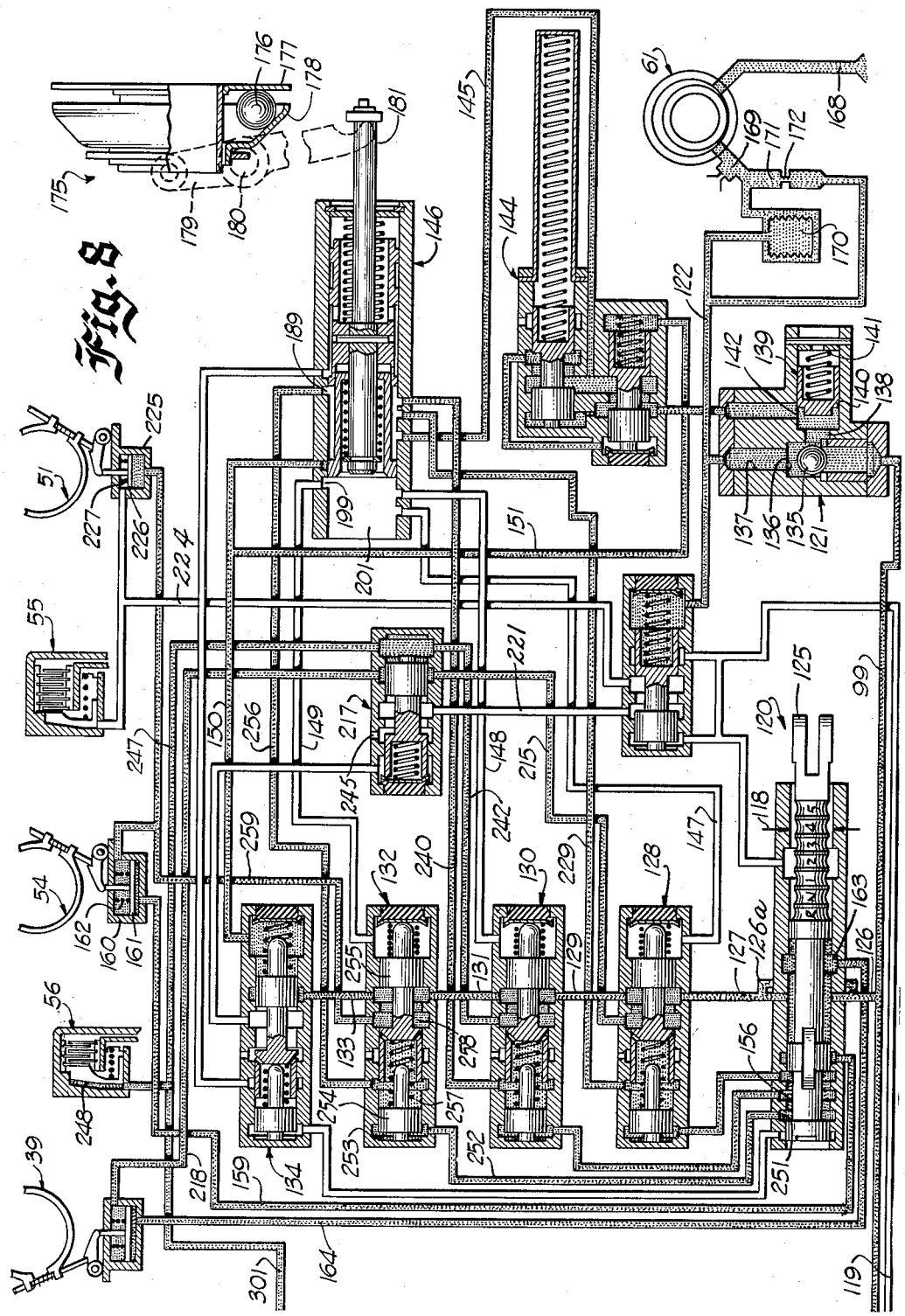

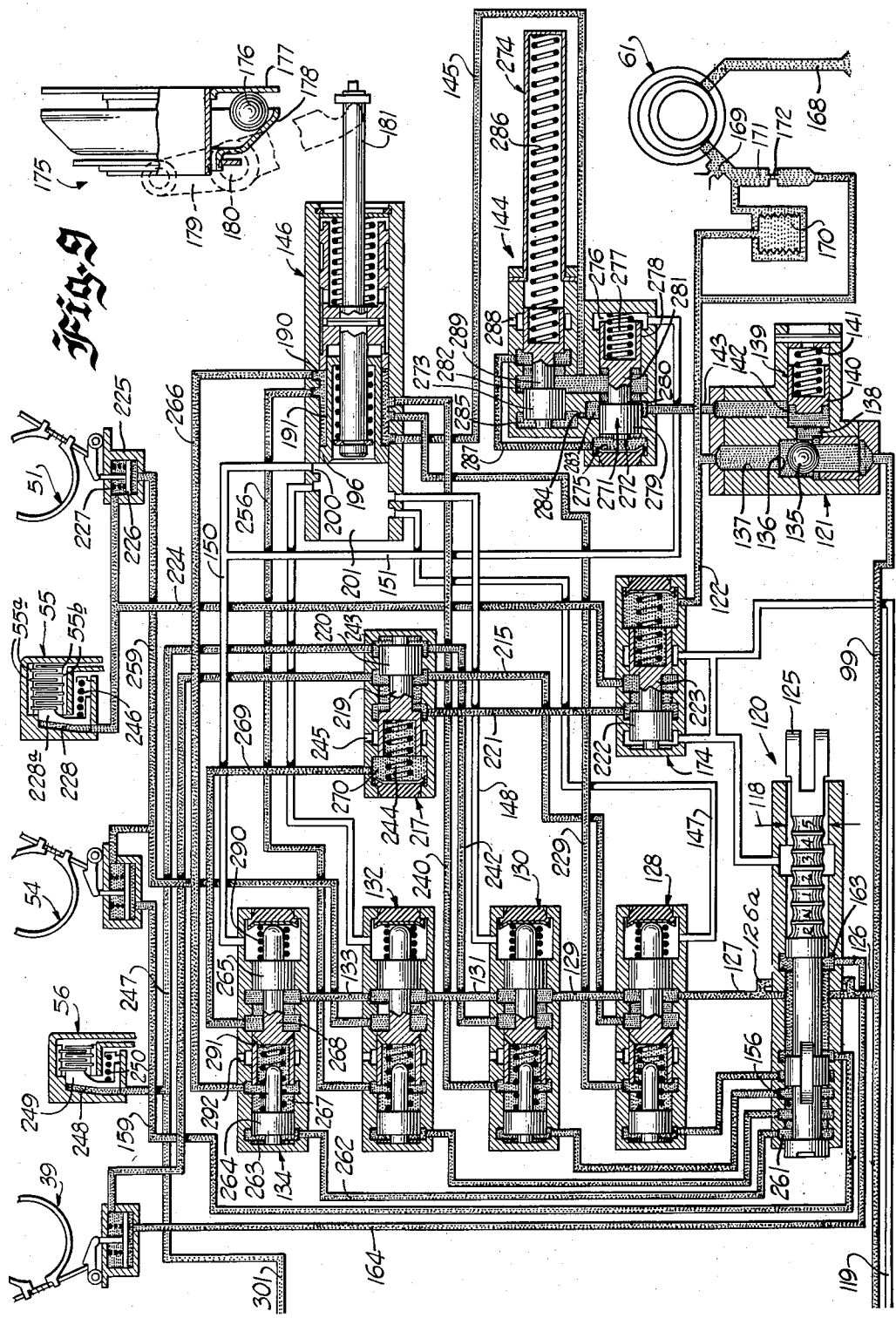

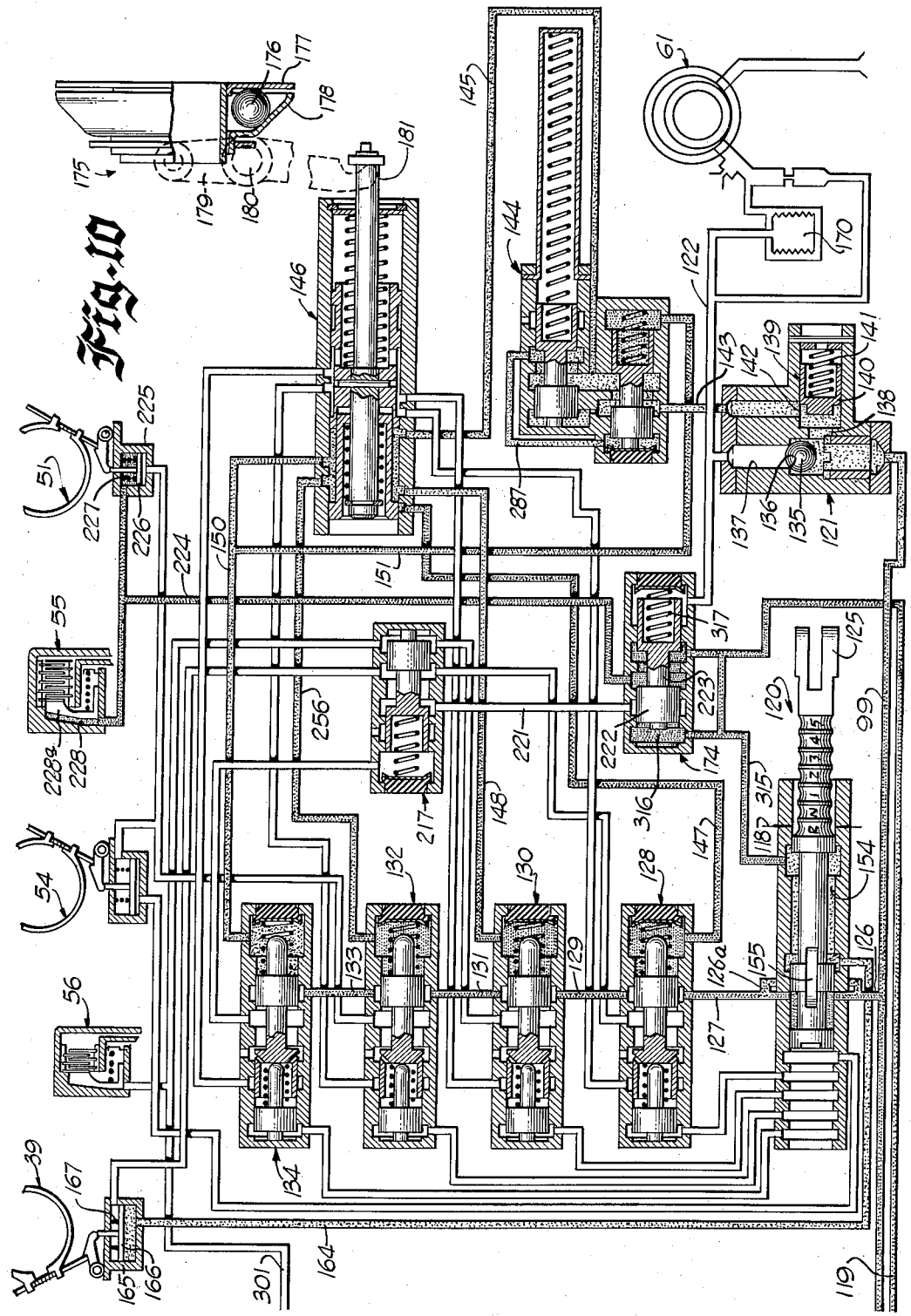

3,025,723
CONTROL SYSTEM FOR TRANSMISSION
James A. Miller, Battle Creek, Mich., assignor to Clark Equipment Company, a corporation of Michigan
Filed Aug. 13, 1959, Ser. No. 833,608
17 Claims. (Cl. 74—732)

This invention relates generally to transmissions and more particularly to a control system especially well suited for use in conjunction with multiple speed transmissions of the type employed on heavy duty vehicles such as trucks or the like.

Transmissions of the type used on very heavy vehicles generally require at least five or six forward speed ratios as well as one or more reverse drives and, for this reason, control systems for effecting automatic shift between the ratios often become complex and are usually characterized by the use of a very large number of control valves and the like. It is, of course, desirable to reduce the number of such valves employed to a minimum not only to decrease the cost and size of the transmission, but also to simplify the maintenance problems since each additional valve employed represents a possible source of trouble in operation.

It is, therefore, a principal object of the present invention to provide a transmission control system employing a minimum number of valves and other similar components but which is nevertheless efficient in operation.

Another object of the present invention is to provide a new and improved transmission control system which is simple in construction and may, therefore, be manufactured relatively inexpensively.

Since operators of trucks are very conscious of unnecessary operating costs tending to decrease their profits, one of the primary problems encountered in the use of automatic or semiautomatic transmissions on these vehicles is that of fuel consumption. Most of the automatic transmissions heretofore proposed or employed include a torque converter or fluid coupling coacting with a change speed gearing to establish the different ratios. However, the torque converter or fluid coupling is useful primarily in the lower speed ratios to prevent the vehicle engine from choking in response to load on the drive shaft. Therefore, it has been found desirable to bypass or lock-up the torque converter or fluid coupling in the high speed ratios in order to avoid unnecessary loss in power and, hence, to economize upon fuel consumed.

It is a further object of the present invention to provide a new and improved arrangement for automatically bypassing the torque converter in the highest speed ratios.

Other advantages of the invention reside in certain details of construction and the particular arrangement of several of the components employed and among these may be mentioned the arrangement known as "kickdown" employed for stepping down the transmission from a high speed ratio to a lower speed ratio, the construction of the vacuum modulator for varying the fluid pressure in accordance with the load on the engine and for substantially increasing this pressure for reverse drive and the construction of the shift valves used in making the transition between the different speed ratios.

The invention, both as to its organization and manner of operation, together with further objects and advantages thereof, will best be understood by reference to the following detailed description taken in conjunction with the accompanying drawings wherein:

FIG. 1 is a diagrammatic view illustrating a transmission with which the control system of the present invention may be used;

FIG. 2 is a table showing the various friction devices energized in completing the different drive ratios;

FIG. 3 is a diagrammatic view illustrating a portion of a control system characterized by the features of the present invention and shows particularly the front pump, its regulating valve and associated circuits together with the vacuum modulator for varying the fluid pressure in the system in accordance with the load on the vehicle engine;

FIG. 4 is a diagrammatic view of the remaining portion of the control system shown in FIG. 3 and, when laid beside FIG. 3 shows the control system of the present invention in neutral;

FIG. 5 is a view similar to FIG. 4 but shows the control system in low or first speed ratio;

FIG. 6 is a view similar to FIG. 4 but shows the control system of the present invention in second speed ratio;

FIG. 8 is a view similar to FIG. 4 but shows the control system of the present invention in fourth speed drive;

FIG. 9 is a view similar to FIG. 4 but shows the control system of the present invention conditioned for high or fifth speed ratio; and FIG. 10 is a view similar to FIG. 4 but shows the control system of the present invention conditioned for reverse drive.

THE GEARING

Figure 7:
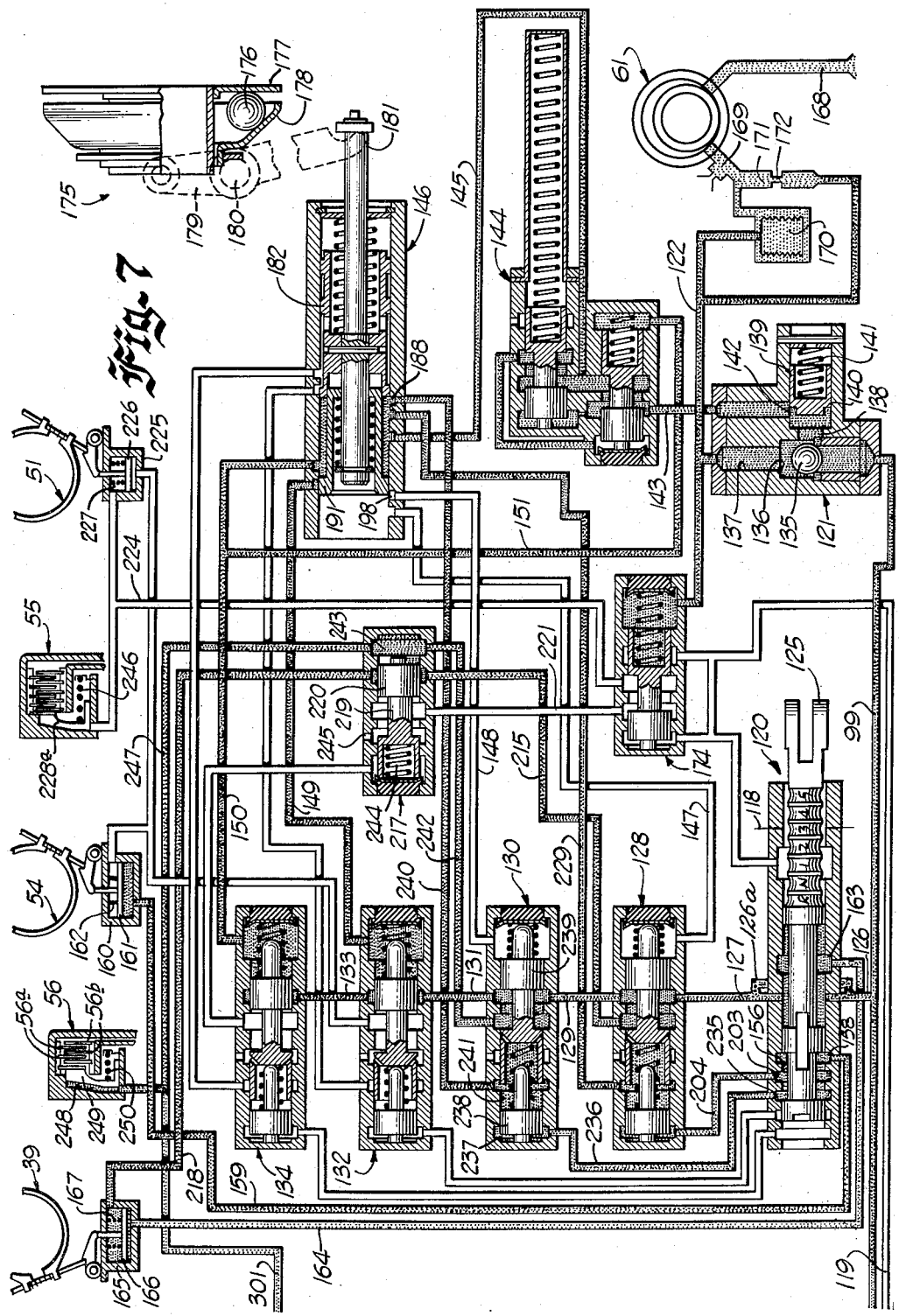
FIG. 7 is a view similar to FIG. 4 but shows the control system of the present invention conditioned for third speed drive.

Referring now to the drawings and, more particularly, to FIG. 1, a transmission gearing is there shown which may be controlled by the system of the present invention although it should be understood that the particular construction of this gearing forms no part of the present invention in that many of the features of the control system here disclosed may be employed in transmissions of completely different design or construction.

The transmission shown in FIG. 1 is similar to that illustrated in FIGS. 1 and 2 of Patent No. 2,827,805 of the present applicant, which patent is assigned to the same assignee as the present invention and may be referred to for a complete understanding of the transmission operation. This transmission is adapted to transfer drive from an engine shaft 20 to an output shaft 21 by way of an intermediate shaft 22. The input shaft 20 is preferably connected to the impeller 23a of a torque converter 23 of conventional construction. The turbine 23b of the torque converter is connected to an intermediate shaft 24 which is adapted to supply drive to a pair of planetary gear sets 26 and 27 connected in tandem to drive the output shaft 21. The latter shaft is, of course adapted to be connected through conventional differential gearing or other suitable connecting means to drive the wheels of the vehicle.

The planetary gear sets 26 and 27 are arranged upon the shafts 21, 22 and 24 within a suitable transmission casing indicated generally by the reference character 25. The input planetary gear set 26 has an input ring gear 28 formed upon the sleeve portion 29 which is secured to the shaft 24 as, for example, by means of a spline connection. The ring gear 28 meshes with a plurality of relatively long pinions 33 rotatably mounted equal distances apart upon a planet carrier 34. Actually three such pinions are provided and these are located 120° apart about the axis of the shaft 22 although, for simplicity, two of the pistons are shown in FIG. 1 as being spaced 180° apart. Each of the pinions 33 meshes with a sun gear 35 formed upon an elongated sleeve 36 mounted for rotation about the intermediate shaft 22. Each of the elongated pinions 33 also meshes with a relatively short pinion 37, the latter pinions being spaced equal distances apart and being rotatably mounted upon the planet carrier 34. The short pinions 37, in turn, mesh with a second ring gear 38 carried upon an annular brake drum 40 which is adapted to be held stationary by means of a fluid operated band brake 39 in order to provide torque reaction for the input gear set 26 and to establish a major speed reduction therein.

The planet carrier 34 includes an integral extension 41 which is splined or otherwise secured to the intermediate shaft 22 in order to provide drive for an input ring gear 43 of the output gear set 27. The latter ring gear meshes with a plurality of equally spaced elongated pinions 44 rotatably supported upon a planet carrier 45 which is provided with an integral extension 46 splined to the output shaft 21. Each of the elongated pinions 44 meshes with a relatively short pinion 47 rotatably supported upon the planet carrier 45 and also meshes with a sun gear 48 formed upon a sleeve 49 supported for rotation about the output shaft 21. An annular brake drum 50 secured to the sleeve 49 may be held stationary by a fluid operated band brake 51 in order to provide torque reaction for the output gear set 27 in establishing a minor speed reduction.

The short pinions 47 also mesh with a ring gear 52 attached to an elongated drum 53 encircling the gear set 27. For the purpose of establishing a major speed reduction in the output gear set 27, the drum 53 may be held stationary by selectively applying a band brake 54. A fluid operated, multiple disc friction clutch 55 is adapted to connect the drum 53 to the sun gear 35 of the input gear set. This clutch is of conventional construction and includes a plurality of clutch plates 55a and 55b respectively carried by the drum 53 and by an integral extension 36a of the sun gear sleeve 36. The plates of the clutch 55 are disposed within a suitable housing and are retained between an annular backing plate and an annular piston 228a (FIG. 6) longitudinally movable within the housing. When the plates are moved into engagement by admission of fluid under pressure to a clutch chamber 228 (FIG. 6) formed in the clutch housing, a biasing spring 246 is compressed and the ring gear 52 of the output gear set 27 is connected directly to the sun gear 35 of the input gear set 26. A second fluid operated clutch 56 similar to the clutch 55 described above functions, when operated, to interconnect the planet carrier 34 and the ring gear 38 of the input gear set in order to lock this gear set and provide a direct drive from the input shaft 24 to the intermediate shaft 22. To this end, the clutch 56 includes sets of clutch plates 56a and 56b respectively connected to the brake drum 40 and to an integral extension 34a of the planet carrier 34.

The transmission shown in FIG. 1 provides a neutral condition, five forward speed drive ratios and a single reverse drive. In neutral, all three of the brakes 39, 51 and 54 and both of the clutches 55 and 56 are disengaged so that no torque is transmitted either to the intermediate shaft 22 or to the driven shaft 21. As will be apparent from the chart or table shown in FIG. 2, the low or first forward speed ratio is established by simultaneously applying brakes 39 and 54, thereby holding both of the ring gears 38 and 52 stationary to establish major speed reductions in both of the gear sets.

The second forward speed ratio is obtained by releasing the brake 39 and applying clutch 55 while maintaining the band brake 54 applied. Application of the clutch 55 locks the sun gear 35 to the engaged band brake 54 in order to place the input gear set 26 in minor speed reduction by holding its sun gear stationary. The output gear set 27, of course, remains in major speed reduction since the brake 54 remains applied.

The third speed ratio is obtained by releasing the clutch 55 and applying the clutch 56 while holding the band brake 54 applied. With the clutch 56 applied, the planet carrier 34 of the input gear set 26 is connected to the ring gear 38 and the input gear set is, therefore, locked to provide direct drive from the shaft 24 to the ring gear 43. The output gear set 27 obviously remains in major speed reduction.

To provide the fourth speed ratio, the brake 54 is released and the brake 51 is actuated while the clutch 56 remains applied. Under these conditions a direct drive is maintained to the ring gear 43 while the application of the band brake 51 places the output gear set in minor speed reduction by holding the sun gear 48 stationary.

The fifth forward speed drive ratio is obtained by releasing the brake 51 and actuating the clutch 55 while at the same time maintaining the clutch 56 applied. Under these conditions, the input gear set is locked for direct drive and the ring gear 52 of the output gear set is connected directly to the sun gear 35. Thus, output gear set 27 is also locked up and a direct drive is established from the input shaft 24 to the output shaft 21.

Reverse drive is effected by simultaneously applying the band brake 39 and the clutch 55. As indicated above, major speed reduction is provided in the input gear set 26 when the brake 39 is applied while application of the clutch 55 functions to connect the sun gear 35 to the ring gear 52 so that a dual path of power flow is provided from the input gear set to the output gear set. The output planetary gear set 27 functions to recombine the two paths of power flow and produces a reverse drive of the output shaft 21.

CONTROL SYSTEM—GENERAL DESCRIPTION

The transmission casing 25 also houses front and rear pumps 60 and 61 which perform in a manner described more fully hereinafter to pressurize and feed oil to the torque converter 23, to provide lubrication for the transmission gearing, to cool the friction brakes and clutches, if necessary, and to provide fluid pressure for the control system shown in FIGS. 3 to 10, inclusive, for the purpose of controlling the application of the friction brakes and clutches. The control system functions to effect the selective actuation of the three band brakes and the two fluid operated clutches in pairs as described above in order to establish the five forward speed ratios as well as reverse and neutral. The system is adapted to provide for manual operation through the five forward speed ratios or, in the alternative, to provide automatic operation for second through fifth speeds and to effect kickdown from the fifth speed ratio to the fourth speed ratio by operation of the accelerator for the vehicle. Thus, the operator may shift into the first forward speed manually and, after the vehicle accelerates sufficiently, he may select any speed from second to fifth whereupon the transmission will automatically shift up to the selected speed ratio and down again in response to changes in the speed of the vehicle and the load on the engine shaft.

*Front Pump*

As indicated above, the fluid pressure for the control system is supplied by the front pump 60 driven from the shaft 24 and by the rear pump 61 driven from the output shaft 21. The input fluid for both of these pumps is supplied from a common reservoir or sump formed near the bottom of the transmission casing 25 but not illustrated in the drawings. The front pump 60 is of the positive displacement type with the displacement being variable under the control of a line pressure regulator 62 (FIG. 3) in order to provide substantially constant pressure. Specifically, a suitable fluid, such as oil, is supplied from the sump or reservoir through an inlet passage 63 for pressurization by the pump 60 and delivery through an outlet passage 64 to the pressure regulator 62 and to a vacuum modulator 65 which functions, as described more fully hereinafter, to vary the pressure of the fluid from the front pump in accordance with the load on the vehicle engine. The front pump 60 also supplies fluid through an outlet passage 66, through a pressure regulating valve 67 and through a fluid passage 68 to the inlet of the torque converter 23 for the purpose of filling the latter with oil. The fluid at the outlet of the torque converter 23 passes through a passage 69 to a passage 70 supplying lubricating fluid for the gears and other moving parts of the transmission. The fluid flow between the lines 69 and 70 may take one of two paths, the first such path being through an oil cooler 71 which functions to remove heat from the oil before it is delivered to the passage 70 and the second such path being through a thermostatic bypass valve 72 and through a fluid passage 73. The valve 72 is opened to bypass the oil cooler 71 whenever the temperature of the fluid is so low that it does not require cooling. In the event that the temperature of the fluid rises, however, the valve 72 is automatically closed and the fluid is diverted to the oil cooler 71.

The torque converter pressure regulating valve 67 is of conventional construction and includes a regulating orifice 74 which coacts with a movable piston 75 to control the pressure of the fluid delivered to the line 68. To this end, the piston 75 is biased toward the right as viewed in FIG. 3 by means of a spring 76 while the pressure of the fluid at the blind end 77 of the valve bore acts in opposition to the spring 76. Thus, if the pressure in the chamber 77 tends to increase the piston 75 is moved toward the left to decrease the size of the orifice 74 in order to decrease the pressure of the fluid supplied to the torque converter 23 through the line 68. Movement of the piston 75 to the left is limited by a fixed stop 75a extending through the spring 76 and the valve bore. In similar manner, if the pressure in the chamber 77 tends to decrease the spring 76 forces the piston 75 to the right to increase the size of the orifice 74 and increase the pressure in the line 68. Thus, the pressure regulator 67 functions to insure that the fluid delivered to the torque converter 23 and to the lubricating line 70 remains at substantially constant pressure.

The pump 60 includes a pair of pumping elements 78 and 79 with the element 79 being driven from the shaft 24 and the element 78 being movable upwardly or downwardly as viewed in FIG. 3 under the control of fluid from the pressure regulating valve 62 for the purpose of varying the eccentricity of the pumping elements to control the displacement of the pump. The pumping element or sliding plate 78 is normally urged upwardly towards its full eccentricity, maximum displacement position by means of a biasing spring 80 acting on its underside as viewed in FIG. 3.

To control the sliding movement of the plate 78 a chamber 81 at the upper end of this plate is connected through a passage 82 to the pressure regulating valve 62 while a similar chamber 83 at the lower end of the plate is connected through a passage 84 to the pressure regulating valve. The latter valve includes a valve body 85 housing a slidable piston 86 which functions to cover or uncover ports leading to the passages 82 and 84 described above and also functions to bypass excess fluid from the passage 64 through a vent port 88 connected to the reservoir. To this end, the valve body 85 includes a relatively small diameter valve bore 89 housing the piston 86 and a relatively large diameter chamber 90 which is supplied with fluid from the vacuum modulator 65 through fluid line 91. A spring cup 92 is disposed within the enlarged diameter portion 90 of the valve body and is urged upwardly by the fluid pressure in the chamber 90. The upward movement of the spring cup 92 is limited by an annular shoulder 93 defined between the two bore portions 89 and 90. A spring 94 disposed between the cup 92 and the lower end of the piston 86 normally urges the piston upwardly while the cup 92 is normally urged downwardly against the action of the fluid supplied by the line 91. As long as the piston 86 remains in the position shown in FIG. 3, both of the lines 82 and 84 are blocked and, at the same time, the line 64 is blocked from the vent port 88. In the event that the system requires a lesser amount of fluid, a condition which may be accompanied by an increase of pressure in the line 64 or by a decrease of pressure in the chamber 90, the piston 86 is moved downwardly so that the fluid in the line 64 flows through an axial bore 95 extending partially through the piston 86 and is delivered through ports 96 to the fluid line 82. The fluid pressure in the line 82 is supplied to the chamber 81 where it acts to move the sliding plate 78 downwardly in order to decrease the displacement of the pump 60 by decreasing the eccentricity of the pumping elements. At the same time, the fluid line 84 is connected to the vent port 88 through an annular groove formed by piston lands 86a and 86b. If after the pumping element 78 has been moved to its minimum eccentricity, minimum displacement position, the fluid demand of the system is still such that the pressure in line 64 tends to rise, the piston 86 is moved downwardly even further to connect line 64 to the vent port 88 in order to bypass any excess fluid.

If, on the other hand, the system should demand an increased amount of fluid, a condition accompanied by a decrease of pressure in line 64 or by an increase of pressure in chamber 90, the spring 92 forces the piston 86 upwardly to connect the line 84 through the ports 96 and through the bore 95 to the line 64 so that fluid under pressure is delivered to the lower chamber 83 where it functions to raise the sliding plate 78 and increase the displacement of the pump until the demand is met. At this time, the line 82 and the upper chamber 81 are connected to the sump through a vent port 87. In view of the foregoing description it will be observed that the displacement of the front pump 60 is automatically varied by the regulator valve 62 to supply sufficient oil to meet the system demand through the 64 and through a fluid supply line 99 connected thereto. During starting the spring 80 biases the plate 78 to the full eccentricity position so that maximum fluid is available to the system. In this position, the plate 78 closes an eyebrow opening 59 leading to the torque converter supply line 66 so that the torque converter will not drain off an inordinate volume of the available fluid. As soon as the plate 78 is moved from the full eccentricity position by the supply of fluid from the valve 62 to the chamber 81 in the manner described above, the opening 59 begins to open to allow the torque converter to fill. At any time thereafter, the opening 59 will be closed whenever the fluid demand is such that the plate 79 is in the full eccentricity position and, hence, the torque converter will be supplied with fluid only when the front pump is capable of meeting the torque converter requirements.

*Vacuum Modulator*

Considering next the operation of the vacuum modulator 65, it will be recalled that this device serves to vary the pressure of the fluid delivered to the control system in accordance with the load on the vehicle engine. To this end, the fluid in the line 64 is delivered through a fluid passage 100, through a passage 101 in the vacuum modulator, through a variable orifice 102 and through a chamber 103 to the line 91 connected to the pressure regulating valve 62. The size of the orifice 102 is controlled by a piston 104 mounted for sliding movement within a valve bore 105.

It is the purpose of the vacuum modulator 65 to control the size of the variable orifice 102 in accordance with the load on the vehicle engine in order to control the pressure drop across this orifice and, hence, to vary the loading on the spring 94 of the pressure regulator valve 62, thereby to vary the displacement of the front pump in the manner described above in order to control the pressure of the fluid delivered to the control system through the line 99. To this end, the vacuum modulator includes a diaphragm 106 clamped between an upper body member 107 and a lower body member 108. The diaphragm 106 is adapted to be moved in response to the vacuum existing in the intake manifold in the vehicle engine, which vacuum is connected through a suitable conduit (not shown) to a passage 109 leading to a vacuum chamber 110 formed within the lower body member 108. The diaphragm 106 is interposed between a pair of plates or discs 111 and 112 with the disc 112 being biased against the undersurface of the diaphragm by means of a spring 113. The disc 111 is urged against the upper surface of the diaphragm by means of a cup 114 mounted for sliding movement within the lower end of the valve bore 105. A biasing spring 115 interposed between the cup 114 and the piston 104 urges the disc 111 against the diaphragm 106 and, at the same time, biases the piston 104 toward the upper end of the valve bore 105 as viewed in FIG. 3. A chamber 116 formed in the upper body member 107 is maintained under atmospheric pressure by an air passage 117.

The vacuum existing in the intake manifold of the engine, of course, varies with the load on the engine and, since this vacuum is supplied to the chamber 110, the position of the diaphragm 106 changes with the variations in the intake pressure. Thus, when the engine is idling and the vacuum is relatively high, the diaphragm is moved downwardly against the action of the biasing spring 113 by the atmospheric pressure existing within the chamber 116 and by the action of the biasing spring 115. Downward movement of the diaphragm 106 is, of course, accompanied by a downward movement of the cup 114 and by a corresponding movement of the piston 104 so that the size of the orifice 102 is reduced, thus decreasing the pressure of the fluid supplied through the line 91 to the pressure regulator 62. As indicated above, a decrease in pressure in the chamber decreases the loading on the piston 86 so that the latter moves downwardly to supply fluid to the chamber 81 in order to decrease the displacement of the front pump and to decrease the pressure of the fluid existing in the line 64. Thus, whenever the engine is idling or is operating under relatively light load, the pressure of the output fluid delivered to line 99 is relatively low.

In similar manner, when the load on the engine is high and the vacuum in the intake manifold is low, the diaphragm 106 moves the plunger 114 and the piston 104 in a direction to increase the size of the variable orifice 102 in order to increase the pressure supplied by the line 91 to the lower end of the pressure regulating valve 62. This action, of course, causes the piston 86 to move upwardly to supply fluid to chamber 83 in order to increase the displacement of the front pump. Thus, a heavy load on the engine results in an increase of the pressure existing in the line 64 so that a greater fluid pressure is available for holding the brakes and clutches in order to avoid the possibility of these clutches slipping under a very heavy load. The vacuum modulator 65 also receives fluid from line 119 when the control system is conditioned for reverse drive so that the fluid pressure delivered to the line 99 is greatly increased for reverse drive in a manner which will be described more fully hereinafter.

*Manual Selector Valve*

The fluid in the line 99 is supplied to a manually operated selector valve 120 shown in FIGS. 4 to 10, inclusive, and is also supplied to one side of a check valve 121 which has its other side exposed to fluid supplied from the rear pump 61 through line 122. The selector valve 120 includes a valve body 123 (FIG. 4) ported in the manner shown in FIGS. 4 to 10 together with a slidable piston 124 manually movable by means of suitable mechanism secured to its free end 125 between a neutral position shown in FIG. 4, a reverse position shown in FIG. 10 and first, second, third, fourth and fifth forward speed positions respectively shown in FIGS. 5, 6, 7, 8 and 9. The mechanism connected to the free end 125 of the piston terminates in a control lever (not shown) operable from the driver's compartment of the vehicle.

*Neutral*

In the neutral position shown in FIG. 4 with the groove "N" on the piston stem of valve 120 in alignment with arrow pointed line 118, the rear pump 61 is inoperative since the output shaft 21 is not driven and, as a consequence, all of the fluid for the control system is supplied from the front pump as illustrated by the filled fluid lines. More specifically, the fluid in line 99 is delivered through passage 126, through the selector valve 120, through a by-pass passage 126a around fluid passage 127, through a first to second shift valve 128, through a fluid passage 129, to a second to third shift valve 130, through fluid passage 131, to a third to fourth shift valve 132 and through a fluid passage 133 to a fourth to fifth shift valve 134. The fluid under pressure delivered from the line 99 to the check valve 121 seats a ball 135 against a valve seat 136 to block the flow of fluid from line 99 to line 122 through an outlet passage 137 from the check valve. This check valve blocks fluid flow from the front pump through the line 122 to the rear pump and thus prevents the rear pump from being driven as a motor. The fluid from the front pump passes through a port 138 and, as long as its pressure exceeds a predetermined value, it acts upon an anti-hunt valve 139 to force a plunger 140 of the latter valve to the right as viewed in FIG. 4 against the action of a biasing spring 141. Movement of the plunger 140 to the right uncovers a port 142 to deliver fluid through passage 143, through a kickdown valve 144 and through a fluid line 145 to a joint load-speed responsive control valve 146 which is the sensitive heart of the automatic shifting system. The latter valve supplies fluid through lines 147, 148, 149 and 150 to the shift valve 128, 130, 132 and 134, respectively, and also supplies fluid through line 151 to the kickdown valve 144 for a purpose which will become evident as the description proceeds. Thus, with the selector valve 120 in neutral position, the various valves of the system and their associated fluid supply lines are filled.

*Anti-Hunt Valve*

During the filling period both in the neutral and the forward speed positions of the selector valve, the anti-hunt valve 139 functions to prevent hunting of the various valves in the system. Without this valve, it is likely that the various valves employed in the control system could start their travel under full line pressure and any drop in this pressure, due, for example, to the filling of one or more of the cylinders controlling the brake bands or clutches or the filling of the various chambers for the valves, would cause the valves to retract or revert to their original position. Retraction of the shift valves would, of course, interrupt the flow of fluid to the cylinder for applying the brakes and clutches until the line pressure was restored to normal value. Therefore, the valves might tend to shuttle between their opened and closed positions until the cylinders are completely filled, with the result that the transmision would tend to hunt and create undesirable behavior of the vehicle. However, in the arrangement shown in FIGS. 4 to 10, inclusive, a drop in line pressure causes the biasing spring 141 to push the plunger 140 toward the left thus blocking the port 142 and trapping fluid behind each of the shift valves to prevent their retraction. With the port 138 blocked, the pressure from the front pump existing in the line 99 can be restored to normal value at which time the valve 139 will open to permit the system to complete the fill. Since the shift valves are prevented from returning to their closed position during the period required for the restoration of the normal line pressure, it will be apparent that the valve 139 prevents hunting of the transmission.

*First Speed Ratio*

To start the forward movement of the vehicle the operator places the valve 120 in the low or first speed position shown in FIG. 5 whereupon the fluid fills those lines which are dotted so that the brakes 39 and 54 are applied to establish the first speed ratio in the manner described above. Specifically, when the control valve 120 is moved from the neutral to the low speed position by moving the plunger 124 one step to the left to bring the groove indicated at "1" on its stem into alignment with arrow pointed line 118, a land 152 on the piston 124 uncovers port 153 so that the fluid from the passage 126 fills an annular chamber 154 defined by the valve body 123 and by an annular groove in the valve piston. The fluid in the chamber 154 flows through a passage or slot 155 formed in the periphery of the valve piston 124 to a chamber 156 defined between the land 152 and a second land 157. With the selector valve 120 in the first speed position, the chamber 156 is exposed to a port 158 so that fluid under pressure is delivered through a line 159 to the lower end of a cylinder 160 housing a piston 161 suitably connected to operate the band brake 54. The piston 161 is normally biased toward the open or lowermost position shown in FIG. 5 by means of a spring 162 with the result that the band brake 54 is normally deenergized or deactivated in the absence of fluid under pressure in the line 159. The flow of fluid through line 159, of course, moves the piston 161 upwardly to compress the spring 162 and to apply the band brake 54.

At the same time, the chamber 154 opens to a port 163 which delivers fluid through a line 164 to the lower end of a cylinder 165 housing a piston 166 for operating the band brake 39. Here again, the piston 166 is normally biased toward the lower end of the cylinder 165 by means of a spring 167 but application of fluid under pressure through line 164 compresses the spring 167 and applies the band brake 39. With both of the brakes 39 and 54 applied, the transmission is in its first speed ratio with both of the gear sets 26 and 27 in major speed reduction.

*The Rear Pump*

When the first forward speed ratio is established, the vehicle begins its forward movement whereupon the rear pump 61 begins to draw fluid through an inlet passage 168 connected to the sump or reservoir and to deliver this fluid to an outlet passage 169. The rear pump 61 is of the constant displacement, variable pressure type and, since it is driven by the shaft 21 it is effective to deliver fluid only when the vehicle is moving forward. An inlet line 173 including a very small flow restricting orifice serves to deliver fluid from the sump to the rear pump when the shaft 21 is driven in reverse, thereby lubricating the rear pump and preventing its pumping elements from turning in a dry condition.

An oil filter 170 is provided in the outlet line 169 to filter the fluid supplied from the rear pump. A bypass line 171 including a restricted orifice 172 insures continuous rear pump operation by providing for bypass of the fluid in the event that the filter 170 becomes clogged or is otherwise defective. In any event the fluid from the filter 170 and that from the bypass line 171 is recombined in the line 122 and is delivered to the check valve 121 where it acts upon the ball 135 in opposition to the fluid supplied from the front pump through the line 99. The ball 135 is moved from the annular valve seat 136 whenever the pressure of the fluid from the rear pump is sufficient to overcome that from the front pump. Therefore, as the vehicle is accelerated from a dead stop, the front pump initially supplies all of the operating fluid but, as the speed of the vehicle increases the rear pump supplies an amount of fluid which increases linearly, thus progressively, decreasing the amount of fluid required from the front pump. The fluid in the line 122 is also supplied to a reverse interlock valve 174 which will be described more fully hereinafter.

*Load Speed Responsive Valve*

After the vehicle has started its forward movement the operator may manually shift through second, third, fourth and fifth forward speed ratios or, in the alternative, he may select any one of these ratios in which case the transmission will automatically shift up to and down from the selected ratio as the speed and load conditions dictate. The manual operation will be considered first but, before beginning this description, it is desirable to consider the joint load-speed responsive valve 146 in view of the fact that this valve senses the speed and load conditions and controls the operation of the system in accordance with these conditions. To this end, the valve 146 is controlled by a governor 175 of the centrifugal ball type which is responsive to the speed of the output saft 21. Thus, as the speed of the shaft 21 increases, a plurality of balls 176 (FIG. 5) are moved radially outward and act against a fixed plate 177 to move a retaining plate 178 to the left as viewed in each of FIGS. 4 to 10, inclusive. The plate 178 is suitably connected to the upper end of a lever 179 indicated in broken lines so that the leftward movement of the plate pivots the lever about a fixed pivot pin 180 in a counterclockwise direction. The lower end of the lever 179 bears against a fixed collar 181a formed on an elongated rod 181 so that the described counterclockwise pivoting of the lever 179 causes the rod 181 to move a sleeve 182 toward the right against the action of a biasing spring 183. The biasing spring is interposed between the sleeve 182 and a washer 184 seated against a lock ring 185 secured within an annular groove formed in the body 186 for the valve 146. Movement of the sleeve 182 to the right sequentially uncovers a series of ports 187, 188, 189 and 190 to deliver fluid to the shift valves 128, 130, 132 and 134 in the proper sequence. A second sleeve 191 fits within the valve body 186 and has one end slidably received within a hollow chamber 192 defined in the end of the sleeve 182. The sleeve 191 is normally urged into the chamber 192 by means of a biasing spring 193 acting against a collar 194 secured to the elongated rod 181 near its left end as viewed in FIG. 5. The sleeve 191 is carried toward the right by the movement of the rod 181 but is movable with respect to the sleeve 182 by means of fluid under pressure admitted from the line 145 to a valve chamber 195 defined between the sleeve 191 and the valve body 186. The fluid pressure in the chamber 195 acts against an annular flange 196 defined at the end of the sleeve 191 and is directed in opposition to the biasing spring 193 so that this pressure urges the sleeve 191 toward the left as viewed in FIGS. 4 to 10, inclusive. The fluid pressure in the chamber 195 thus acts as a retarding force supplied to the rod 181 through the spring 193. Movement of the sleeve 191 functions sequentially to connect ports 197, 198, 199 and 200 to a vent opening 201 formed at the end of the valve body 186. The pressure of the fluid admitted to the chamber 195 from the line 145 varies in accordance with the load on the engine due to the action of the vacuum modulator 65 and the line pressure regulator 62 in the manner described above. Thus, the movement of the sleeves 182 and 191 is controlled by the action of the governor 175 in response to the speed of the shaft 21 and this movement is also affected by or responsive to the pressure of the fluid supplied to the chamber 195. Obviously, the pressure in the line 145 determines the degree of retarding force applied to the sleeve 191 and effectively lengthens the stroke of the valve 146 under high load conditions. As a result, the uncovering of the various ports by the sleeve 191 is a function both of the speed of the output shaft 21 as well as the load on the engine so that the valve 146 is a joint speed-load responsive device.

*Second Speed Ratio*

Considering now the manual shifting of the transmission and assuming first that the control valve 120 is placed in the second speed position illustrated in FIG. 6 with the plunger groove "2" aligned with the arrow pointed line 118, it will be observed that fluid in the chamber 156 continues to flow through port 158 and through line 159 to the cylinder 160 so that the band brake 54 remains applied. Fluid also continues to flow from port 163 and through line 164 to the cylinder 165 but, since fluid is supplied to the upper side of the piston 166 via a path described below, the band brake 39 is released by the action of the biasing spring 167 in urging the piston 166 to its deenergized position. When the selector valve piston 124 is moved to the second speed position shown in FIG. 6, the land 157 uncovers a port 203 to deliver fluid under pressure from the chamber 156 through passage 204 to an operating chamber 205 formed at the left side of the first to second shift valve 128. The shift valves 128, 130, 132 and 134 are similar in construction and each includes a valve body slidably receiving a pair of separable pistons. The valve body for the first to second shift valve 128 is identified by the reference character 206 while the pistons for this valve are identified by reference numerals 207 and 208. The piston 207 includes an elongated axial extension 209 accommodated within a hollow sleeve portion 210 of the piston 208. A spring 211 encircling the axial extension 209 normally urges the pistons 207 and 208 toward the opposed ends of the valve body. Movement of the piston 207 to the left as viewed in FIGS. 4 to 10 is limited by an axial projection 212 which is so dimensioned that the main body of the piston cannot cover the inlet port to the chamber 205. The piston 208 also includes an axial extension 213 encircled by a spring 214 which functions to urge both of the pistons 207 and 208 toward the left. When the selector valve piston 124 is in the second speed position to admit fluid from the passage 204 to the chamber 205, the pistons 207 and 208 may be fuly nested as shown in FIG. 5 in which case these pistons cannot be moved to the right until the fluid in the line 147 is vented. The line 147 is connected to the vent port 201 by the sleeve 191 only when the speed and load conditions are such as to permit the shifting of the transmission from the first speed ratio to the second speed ratio. When these conditions are reached the annular flange 196 on the sleeve 191 is moved to the position shown in FIG. 6 whereupon the port 197 is uncovered to vent the line 147. With the right side of the shift valve 128 vented, the fluid pressure in the chamber 205 moves both of the pistons 207 and 208 in unison to the right. When the pistons 207 and 208 are moved to the right, the fluid passage 127 is connected to a fluid line 215 through an annular groove 216 defined in the periphery of the valve piston 208. Line 215 is connected through a control valve 217 for the clutch 55 and through a fluid line 218 to the uper end of the cylinder 165. Since the piston 166 is exposed to equal fluid pressures on its upper and lower sides, the biasing spring 167 functions to move the piston to the lower end of the cylinder 165 in order to disengage the band brake 39. The fluid in the line 215 is also delivered through an annular passage 219 formed in a piston 220 of the valve 217 to a fluid line 221 leading to the reverse interlock valve 174. The reverse interlock valve includes a piston 222 having an annular groove 223 formed in its periphery for the purpose of connecting the line 221 to a fluid line 224 leading to the upper side of a cylinder 225 for the band brake 51 and also leading to the annular chamber 228 in the clutch 55. The cylinder 225 contains a piston 226 connected through appropriate linkage to the band brake 51 and biased toward the lower end of the cylinder by means of a spring 227. Application of fluid under pressure to the line 224 cooperates with the spring 227 to maintain the piston 226 in its lower or brake disengaging position so that the band brake 51 is not applied. Introduction of fluid under pressure from the line 224 to the annular chamber 228 results in movement of a clutch piston 228a toward the right as viewed in FIGS. 4 to 10 so that tht clutch plates 55a and 55b are moved into engagement to connect the ring gear 53 to the sun gear 35. With the brake 54 and the clutch 55 applied and with the remaining brakes and clutches in inoperative condition, the output gear set 27 is in major speed reduction while the input gear set is in minor speed reduction so that the transmission is in its second forward speed ratio.

The piston 207 of the shift valve 128 is returned to the left by admission of fluid under pressure from a fluid line 229 through port 230 to the space defined between the two pistons 207 and 208. Fluid is admitted from the line 145 to the line 229 only when the port 187 is uncovered by movement of the sleeve 182 to the right as the vehicle begins to pick up speed. When fluid is admitted through the port 230, the fluid pressures acting on opposed sides of the piston 207 are substantially equal and the biasing spring 211 thus becomes effective to move the piston 207 to the left. The fluid admitted through port 230 cooperates with the spring 211 to maintain the piston 208 in its upshift position at the right of the valve body. The introduction of fluid under pressure through line 229 and port 230 prevents a downshift of the valve piston 208 until the vehicle speed and load conditions are proper as determined by the valve 146. The pistons 207 and 208 remain in the positions illustrated in FIG. 6 until fluid under pressure is again admitted through passage 147 to cooperate with the spring 214 in moving the piston 208 to the left. One or more passages 232 are defined in the sleeve portion 210 of the piston 208 for connection to a vent port 233 when the piston is returned to the closed position.

If the manually operated selector valve 120 is left in the second speed position illustrated in FIG. 6, the transmission will automatically shift between first and second speed ratios as vehicle conditions permit. Considering the automatic downshift from the second to first, it will be observed that this occurs when the sleeve 191 of the valve 146 is moved to the left to connect the port 197 to the line 145 and when the sleeve 182 is moved to the left to break the connection from the port 187 to the line 145. When this occurs the line 229 is vented through one or more vent ports 182a in the sleeve 182 and fluid pressure is admitted through port 197 to the line 147 so that the piston 208 is moved to the left to the position shown in FIG. 5 whereupon the first or low speed ratio is reestablished in the manner described above.

*Third Speed Ratio*

To shift to the third forward speed ratio, the manual selector valve piston 124 may be advanced one step from the position shown in FIG. 6 to that shown in FIG. 7 until the groove marked "3" in the piston stem is aligned with arrow pointed line 118. When the valve piston 124 is moved to the third speed position, fluid continues to flow through port 163 and through line 164 but, since the line 218 is still supplied with fluid under pressure, the piston 166 remains in its lower position so that the band brake 39 is not applied. Fluid under pressure is still delivered through port 158 and through line 159 to the lower end of cylinder 160 so that the band brake 54 remains in applied condition. Movement of the valve piston 124 to the third speed position connects a port 235 in the valve 120 to the chamber 156 so that fluid under pressure is delivered through line 236 to a valve chamber 237 formed at the left end of the second to third shift valve 130 as viewed in FIG. 7. As soon as the sleeve 191 of the joint load-speed responsive valve 146 has been moved sufficiently to the right to uncover port 198 and vent the line 148, the fluid in the chamber 237 is rendered effective to move the two pistons 238 and 239 of the shift valve 130 to the right. The valve 146 then functions to connect the port 188 to the line 145 so that fluid under pressure is delivered through passage 240 to the space 241 between the pistons 238 and 239, thus permitting return of the inhibitor piston 238 to the left by the central biasing spring and, at the same time, maintaining the shift valve piston 239 in its extreme right position as shown in FIG. 7. When the piston 239 is moved to the right, the fluid pressure in line 129 is delivered through line 242 to a chamber 243 formed at the right side of the control valve 217. The fluid pressure in the chamber 243 is effective to move the piston 220 to the left as viewed in FIG. 7 against the action of spring 244 thus terminating the delivery of fluid pressure from the line 215 to the line 221 and, at the same time, connecting the line 221 to sump through the annular groove 219 and through a vent port 245. When fluid pressure is removed from the line 221 and from the line 224 and when these lines are vented, a biasing spring 246 of the clutch 55 becomes effective to return the piston 228a to the left so that clutch plates 55a and 55b are disengaged and the clutch 55 is rendered inoperative. Elimination of fluid pressure from the line 224 has no effect on the band brake 51 in view of the fact that the biasing spring 227 continues to maintain the piston 226 at the lower end of the cylinder 225 with the result that the brake 51 remains disengaged. The chamber 243 is also connected through a line 247 to an annular chamber 248 formed in the housing for the clutch 56. As a consequence, when the valve piston 220 of the control valve 217 is moved to the left, the fluid pressure admitted to the clutch chamber 248 is effective to move an annular piston 249 to the right in order to engage the clutch plates 56a and 56b. With the band brake 54 applied, the output gear set 27 is in major speed reduction while application of the clutch 56 locks up the input gear set 26 for direct drive so that the transmission is in third speed position as described above. If the manually operated selector valve 120 is left in the third speed position, the transmission will function in the manner indicated above automatically to shift up from first to second to third and back again in accordance with the speed and load conditions of the vehicle and their effect upon the joint load-speed responsive valve 146. Since the manner in which this upshifting and downshifting is accomplished is believed to be obvious from the foregoing description, it will not be described in detail.

*Fourth Speed Ratio*

To shift to the fourth forward speed ratio, the piston 124 of the manually operated selector valve 120 is moved one additional step to the left until it reaches the position shown in FIG. 8 with the groove indicated at "4" in alignment with the arrow pointed line 118. With the selector valve in its fourth speed position, a port 251 is uncovered to deliver fluid from the chamber 156 through a line 252 to a chamber 253 formed at the left side of the third to fourth shift valve 132. When the load and speed conditions are such that the joint load-speed responsive valve 146 uncovers port 199 to connect line 149 to the vent 201, the pistons 254 and 255 of the shift valve 132 are moved to the right in unison. As soon as the joint load-speed responsive valve 146 is effective to uncover port 189, fluid under pressure is admitted through a line 256 to the space 257 formed between the pistons 254 and 255, thereby permitting the center biasing spring of the valve 132 to return the piston 254 to the left and, at the same time, maintaining the piston 255 at the right as shown in FIG. 8. When the piston 255 is moved to the right, the line 131 is connected through an annular groove 258 defined in this piston to fluid line 259 which is connected to the upper end of the cylinder 160. The piston 161 is thus exposed on its opposed sides to fluid pressures of substantially equal value and, as a result, the biasing spring 162 acts to urge this piston toward the lower end of the cylinder 160, thereby disengaging the band brake 54. The fluid pressure in the passage 259 is also connected to the lower end of the cylinder 225 and, since the upper end of this cylinder is vented through line 224, through line 221 and through vent port 245, the piston 226 is moved upwardly to compress the biasing spring 227 and to engage the band brake 51. Fluid under pressure continues to flow through line 247 to the annular chamber 248 so that the clutch 56 remains applied. With the clutch 56 applied, the front gear set 26 is locked up for direct drive and, with the band brake 51 applied, the output gear set 27 is in minor speed reduction so that the transmission is in its fourth forward speed ratio.

As previously indicated, if the selector valve 120 is left in the fourth position, the transmission will automatically shift up and down in steps between the first and fourth ratios in such manner that the ratio established corresponds to the load and speed conditions affecting the valve 146.

*Fifth Speed Ratio*

To establish the fifth speed or direct drive, the piston 124 of the manually operated selector valve 120 is moved one additional step to the left until it occupies the position shown in FIG. 9 with the piston groove "5" aligned with the arrow pointed line 118. In this position of the selector valve 120, a port 261 is uncovered to connect the chamber 156 through passage 262 to a chamber 263 formed at the left end of the fourth to fifth shift valve 134. At this time, fluid flow continues to the left side of each of the shift valves 128, 130 and 132 and fluid is also delivered to the space between the two pistons of each of these valves. Thus, each of the valves 128, 130 and 132 remains in its operated position with its two pistons held at opposite ends of the valve cylinder in the manner previously described. As soon as the joint load-speed responsive valve 146 is effective to uncover port 200 and connect line 150 to the vent chamber 201, the fluid delivered to the valve chamber 263 is effective to move valve pistons 264 and 265 to the right in unison. When the valve 146 uncovers port 190, fluid under pressure from the line 145 is delivered through a line 266 to the space 267 formed between the two pistons 264 and 265 with the result that the piston 264 is returned to the left while the piston 265 is maintained at the right as shown in FIG. 9. When the piston 265 has been moved to the right, fluid from line 133 is delivered through an annular groove 268 formed in the valve piston 265 to a fluid passage 269 which is connected to a chamber 270 at the left hand side of the control valve 217. The opposite sides of the piston 220 are thus exposed to substantially equal pressures and, as a consequence, the biasing spring 244 functions to move the piston 220 to the right so that the line 221 is again connected through the annular groove 219 to the fluid pressure in line 215. The line 221 is connected to the line 224 through the groove 223 in the piston 222 of the reverse interlock valve 174 with the result that fluid is admitted to the upper end of the cylinder 225 to balance the fluid forces acting upon the piston 226. The latter piston is, of course, moved to its lower position to disengage the band brake 51 by the action of the biasing spring 227. Application of fluid pressure to the line 224 also fills the clutch chamber 228 to move the piston 228a to the right until clutch plates 55a and 55b are moved into frictional engagement. With the clutch 55 applied the ring gear 53 of the output gear set 27 is connected to the sun gear 35 of the input gear set 26. The band brakes 39 and 54 remain in deenergized condition in view of the fact that both of their pistons are exposed to fluids of equal pressure on their opposite sides. Fluid under pressure continues to flow through line 247 to the annular chamber 248 so that the clutch 56 remains applied to lock up the input gear set 26 for direct drive. With the clutches 55 and 56 both applied, the transmission is conditioned for direct drive in the manner described above and is, therefore, in its fifth forward speed ratio. As long as the manually operated selector valve 120 remains in the fifth speed position shown in FIG. 9, the transmission will automatically shift up and down in steps in the manner indicated above with the shifts between each step taking place as the load and speed conditions acting on the valve 146 permit.

*Reverse*

Referring now to FIG. 10 for a description of the operation of the transmission in reverse drive, it will be observed that the piston 124 of the manually operated selector valve 120 is moved to its extreme right position with the piston groove "R" aligned with the arrow pointed line 118. It will be recalled that the rear pump 61 is operative only when the vehicle is moving forwardly and, as a consequence, all of the fluid for the system is supplied by the front pump 60 during the reverse operation. The fluid delivered from the line 126 to the selector valve 120 passes through passage 155, through chamber 154 and through line 315 to a valve chamber 316 formed at the left side of the reverse interlock valve 174. Since the rear pump 61 supplies no fluid during reverse drive, the line 122 does not supply fluid to the right side of the reverse interlock valve 174 and, as a result, the fluid pressure in the chamber 316 is effective to move the valve piston 222 to the right against the action of spring 317.

The fluid pressure in the line 315 is also delivered through the line 119 to the vacuum modulator device 65. As is shown in FIG. 3, the fluid pressure from the line 119 enters the vacuum modulator through a chamber 318 and passes to the space 319 formed between the cup 114 and the piston 104. The fluid passing to the space 319 forces the piston 104 upwardly to open the pressure reducing orifice 102 and, at the same time, forces the plunger 114 downwardly to act against the diaphragm 106. When the orifice 102 is opened the pressure drop across this orifice is sharply reduced and, as a consequence, the fluid delivered through the line 91 to the line pressure regulator 62 increases sharply in pressure to raise the piston 86 and supply fluid to chamber 83 in order to increase the displacement of the front pump 60, thereby increasing the pressure of the fluid supplied to line 64 and passage 99. The vacuum modulator 65 and the line pressure regulator 62 are preferably so designed that the pressure is doubled for reverse drive, thereby substantially increasing the pressure available for holding the clutch 55 and the band brake 39 in order to prevent slipping of the friction elements of these devices under the heavy load conditions encountered when the transmission is in reverse.

To engage the plates of the clutch 55, the fluid pressure in the line 119 is supplied through the annular groove 223 of the reverse interlock valve 174 to the line 224. The fluid pressure in the line 224 acts in the manner described above to apply the clutch 55 and to supply fluid under pressure to the upper end of the cylinder 225 so that the band brake 251 is disengaged. The fluid pressure in the chamber 154 of the selector valve 120 is supplied through the line 164 to the lower end of cylinder 165 with the result that the band brake 39 is applied in the manner described above. With the brake 39 and the clutch 55 simultaneously applied a dual power path is established from the input gear set 26 to the output gear set 27 to provide reverse drive of the output shaft 21 in the manner described above.

*Automatic Operation*

As previously indicated, the transmission will shift from second through fifth speed ratios automatically and, hence, the manually operated selector valve 120 need not be moved in steps as described above for the manual operation. More specifically, after the vehicle begins its forward movement, the manually operated selector valve 120 may be positioned in any selective speed ratio from second to fifth whereupon the transmission will automatically shift up to the selective speed and down again as the speed and load conditions at the valve 146 dictate. The automatic operation is believed to be apparent from the above description and, hence, will not be described in detail.

*Kickdown*

The automatic operation may be overruled by moving the manually operated selector valve 120 to a lower speed position to cause the transmission to downshift to the selected speed as soon as the conditions at the valve 146 permit. In addition, the transmission may be shifted down from the fifth speed ratio to the fourth ratio by means of the kickdown valve 144 referred to above. Referring particularly to FIG. 9 of the drawings, it will be observed that the kickdown valve 144 actually comprises two separate valves, one of which includes a piston 271 and is indicated generally by the reference numeral 272 and the other of which includes a piston 273 and is indicated generally by the reference character 274. The valve 272 is of the simple reducer type and is adjusted to regulate at the desired line pressure in the system when the transmission is in the fifth speed ratio to supply fluid under pressure to a valve chamber 275 formed at the left of the piston 271 and to vent a valve chamber 276 formed at the right of this piston via the lines 151 and 150 and the port 200 of the joint load-speed responsive valve 146. More specifically, the piston 271 is normally urged to the left by means of a biasing spring 277 nested within a hollow sleeve 278 formed at one end of the piston. The piston 271 includes a land 279 which functions to control the size of a pressure dropping orifice 280. An annular groove 281 formed in the piston delivers fluid from the line 143 to a fluid chamber 282 in the valve 274. The fluid in line 143 is also delivered around the land 279 by an annular recess 283 formed in the body of the valve 272 and then flows through a port 284 to a valve chamber 285 formed at the left side of the piston 273. The piston 273 is similar to the piston 271 but is urged to the left by a spring 286 which is much longer than the corresponding spring 277 acting upon the piston 271. The valve 274 functions in one position to provide a downstream signal for application through a line 287 to the chamber 275 and in a second position connects the line 287 to a vent port 288 through an annular groove 289 formed in the piston 273.

Until the port 200 of the valve 146 is uncovered when the fifth speed ratio is established, fluid under pressure from line 145 is delivered through line 151 to the chamber 276. This condition will exist for each of the first four speed ratios and during each of these ratios fluid is also delivered through line 287 to the chamber 275 so that the fluid forces acting on opposed ends of the piston 271 are balanced and the spring 277 moves the piston 271 to its extreme left position as shown in FIGS. 4 to 8 and 10. Thus, in the first four speed ratios the valve 272 performs no regulating function in view of the fact that the orifice 280 remains constantly open. During the first four speed ratios it will also be observed that the spring 286 is effective to maintain the piston 273 in its extreme left position so that fluid flows from orifice 280 around the annular groove 289 and through the line 287 to the chamber 275. When the fifth forward speed ratio is established, the line 151 is vented through the line 150 and port 200. The operation at this point will depend upon the fluid pressure in the system acting upon the valve piston 273. If this fluid pressure is relatively low, that is, if the accelerator pedal or throttle is either completely or substantially released, the force of the spring 286 is sufficient to hold the piston 273 in its extreme left position so that fluid is delivered from the passage 282 through the annular groove 289 and through the line 287 to the chamber 275. Fluid pressure in the latter chamber moves the piston 271 to the right against the spring 277 to produce a regulating action at the orifice 280. By proper design of the valve 272, the fluid supplied to the line 145 is regulated at substantially the desired system pressure. The valve 272 continues to perform its pressure regulating function as long as the transmission remains in fifth speed and as long as the piston 273 remains in its left position. In the event that it is desired to step down the transmission from fifth speed ratio to fourth speed ratio, the accelerator of the vehicle may be suddenly depressed to open the engine throttle and sharply increase the pressure in the system through the action of the vacuum modulator 65 and the line pressure regulator 62 in the manner described above. When the system pressure is increased beyond a predetermined point the pressure of the fluid in the chamber 285 is sufficient to overcome the spring 286 to move the piston 273 to the right, thus connecting the line 287 through the annular groove 289 to the vent port 288. The valve chamber 275 is thus vented and the spring 277 moves the piston 271 to its extreme left position so that unregulated, relatively high line pressure is admitted from line 143 through the completely open orifice 280 to the line 145 leading to the joint load-speed responsive valve 146. This relatively high fluid pressure acts upon the flange 196 to move the sleeve 191 to the left a sufficient distance to connect the port 200 to the fluid pressure in the line 145 with the result that the valve chamber 276 is again supplied with fluid under pressure from the line 151. The fluid in the chamber 276 has no effect on the operation of the valve 272 at this time since the valve is already biased by the spring 277 to its extreme left position. However, connection of port 200 to the line 145 supplies fluid under pressure through the line 150 to the right side of the fourth to fifth shift valve 134 so that the piston 265 is exposed to fluid pressures of equal value on its opposite faces. A biasing spring 290 in the shift valve 134 thus moves the piston 265 to the left to block fluid flow from the line 133 to the line 269 and to connect the line 269 through the annular groove 268 to the vent port 292. The fluid in the space 267 is also vented through passages 291 and port 292 to permit the leftward movement of the piston 265. The chamber 270 is vented through line 269 so that the fluid pressure in the chamber 243 on the right side of the piston 220 moves this piston to the left against the spring 244 to break the connection between the line 215 and the line 221. When the piston 220 is moved to the left, the line 221 is connetced through the annular groove 219 to vent port 245 thus venting the line 224 and permitting the biasing spring 246 to disengage the friction plates of the clutch 55. Venting of the line 224 also results in removal of fluid pressure from the upper side of the piston 226 and, as a consequence, the fluid pressure supplied to the cylinder 225 from the line 259 forces the piston 226 upwardly to engage the band brake 51. The fluid flow through the line 227 to the clutch chamber 248 is not disturbed and, as a consequence, the clutch 56 remains applied. When the clutch 55 is disengaged and the band brake 51 is applied the output gear set is placed in minor speed reduction while the input gear set 26 remains locked up for direct drive with the result that the transmission has now been stepped down from the fifth ratio to the fourth ratio. When the throttle is released and the line pressure has been restored to normal the spring 286 returns the piston 273 to the left and, as soon as conditions at the load-speed responsive valve 146 permit, that is, as soon as port 200 is uncovered to connect line 151 to the vent chamber 201, the transmission reverts to its fifth speed ratio and the valve 272 again begins to regulate in the manner described above.

*Torque Converter Lock-Up*

As previously indicated, it is desirable to bypass or lock-up the torque converter 23 during the higher speed ratios in order to avoid torque converter losses and, as a result, to minimize the amount of fuel consumed by the vehicle engine. To this end, a clutch 295 as shown in FIG. 3 is provided for connecting the input shaft 20 directly to the intermediate shaft 24 whenever the transmission is in its third, fourth or fifth speed ratios. While the lock-up clutch 295 may take a number of forms, it is illustrated in FIG. 3 as including a clutch plate 296 secured for rotation with the input shaft 20 and the impeller 23a of the torque converter. A piston 297 splined to the shaft 24 and mounted for sliding movement on this shaft carries a second clutch plate 298 which is adapted to engage the clutch plate 296 to provide the torque converter bypass. In all except the third, fourth and fifth speed ratios, fluid under pressure is supplied to a piston chamber 299 formed on the left side of the piston 297 as viewed in FIG. 3 and this fluid pressure balances the pressure of the torque converter fluid which is supplied through line 68 and which acts upon the right side of the piston 297.

A valve 300 is employed to control the fluid flow from the line 68 to the chamber 299 and this valve is, in turn, operated by fluid flow from line 301 which is connected directly to the line 247 described above. The valve 300 includes a piston 302 slidably mounted within a valve bore 303 and normally urged to the right by a spring 304. In the absence of fluid pressure from the line 301, the spring 304 maintains the valve piston 302 in the position shown in FIG. 3 whereupon fluid is delivered from line 68 through passage 305 through an annular groove 306 formed in the piston 302, through passage 307 formed in the transmission casing 25 and through passage 308 formed in the shaft 24 to the chamber 299. As indicated above, the fluid pressure in the chamber 299 balances the torque converter fluid pressure acting on the right side of the piston 297 so that suitable biasing springs 311 maintain the clutch 295 in deenergized condition.

When the transmission is conditioned for third speed drive, fluid under pressure is delivered through line 227 to apply the clutch 56 and this fluid flow continues through the fourth and fifth speed ratios. The fluid pressure in the line 227 passes from line 301 to a valve chamber 309 formed at the right side of the piston 302 and this fluid pressure is sufficient to overcome the spring 304 and move the piston 302 to the left side of the valve bore 303. When the piston 302 is moved to the left, the line 305 is covered and the passage 307 is connected through the annular groove 306 to a vent port 310. When the chamber 299 is vented through the passages 307, 308 and through the valve 300, the torque converter fluid pressure supplied from the line 68 and acting upon the right side of the piston 297 is sufficient to move the piston to the left against spring 311 until the clutch plates 296 and 298 are engaged whereupon the input shaft 20 is connected directly to the intermediate shaft 24 and the torque converter 23 is bypassed. The use of the fluid flow to the clutch 56 to effect the torque converter lock-up or bypass provides a convenient and simple method of avoiding the torque converter losses and is an important feature of the present invention.

*General*

As previously indicated, the gear sets 26 and 27 and the pumps 60 and 61 are housed within the transmission casing 25 and are compactly arranged to provide a relatively small unit. A valve body housing the shift valves and the other control elements illustrated in the drawings is attached to the bottom of an adapter plate secured to the casing 25. The adapter plate contains a plurality of passages for directing fluid flow from the various valves in the valve body to suitable openings in the transmission casing in order to establish the control circuit described above. In this manner a substantially closed unit is provided with the only external connection being a conduit leading from the vacuum modulator 65 to the intake manifold in the engine and a suitable linkage for operating the manually operable selector valve 120 from the operator's seat in the vehicle.

In view of the foregoing description, it is believed that the operation of the transmission including the control system will be readily understood. While a particular embodiment of the invention has been described, it is apparent that many modifications will readily occur to those skilled in this art and it is, therefore, contemplated by the appended claims to cover any such modifications as fall within the true spirit and scope of the invention.

What is claimed as new and desired to be secured by Letters Patent of the United States is:

1. In a transmission of the type employing a pair of constantly meshing planetary gear sets connected between an input shaft and an output shaft together with fluid actuated friction devices coacting with said gear sets to establish a plurality of relatively high speed drives and a plurality of relatively low speed drives, each of said drives being completed by the simultaneous actuation of a different pair of said devices and a first of said devices remaining actuated for all of said relatively high speed drives, the combination of a hydrodynamic apparatus driven by the input shaft and effective to supply input drive to said gear sets, a fluid actuated clutch operable to supply drive from said input shaft to said gear sets and to render said hydrodynamic apparatus ineffective, a fluid supply system for supplying fluid to said hydrodynamic apparatus and including valves operable in sequence to effect the delivery of pressure fluid to said friction devices, and means operated by the pressure fluid acting upon said first friction device for actuating said clutch to render the hydrodynamic device ineffective for all of said relatively high speed drives, the pressure fluid for said means and said first friction device being delivered through a common one of said valves.

2. In a transmission of the type employing a pair of constantly meshing planetary gear sets connected between an input shaft and an output shaft together with fluid actuated friction devices coacting with said gear sets to establish a plurality of relatively high speed drives and a plurality of relatively low speed drives, each of said drives being completed by the simultaneous actuation of a different pair of said devices and a first of said devices remaining actuated for all of said relatively high speed drives, the combination of a hydrodynamic apparatus driven by the input shaft and connected to drive one of the gear sets, a fluid actuated clutch operable to connect the input shaft to drive said one gear set in order to render said hydrodynamic apparatus ineffective, a fluid supply system for supplying fluid to said hydrodynamic apparatus and including valves operable to effect the selective delivery of pressure fluid to said friction devices, and means responsive to the pressure fluid acting upon said first friction device for operating said clutch to render the hydrodynamic device ineffective for all of said relatively high speed drives, the pressure fluid for said means and said first friction device being delivered through a common one of said valves.

3. In a transmission of the type employing a pair of constantly meshing planetary gear sets connected between an input shaft and an output shaft together with fluid actuated friction devices coacting with said gear sets to establish a reverse drive and at least five forward speed drives, each of said drives being completed by the simultaneous actuation of a different pair of said devices and a first of said devices remaining actuated for at least the two highest of said forward speed drives, the combination of a hydrodynamic apparatus driven by the input shaft and effective to supply input drive to said gear sets, a fluid actuated clutch operable to supply the drive to said gear sets and to render said hydrodynamic apparatus ineffective, a fluid supply system for supplying fluid to said hydrodynamic apparatus and including valves operable in sequence to effect the delivery of pressure fluid to all of said friction devices, and means operated by the pressure fluid acting upon said first friction device for actuating said clutch in order to render the hydrodynamic device ineffective for said two highest forward speed drives, the pressure fluid for said means and said first friction device being delivered through a common one of said valves.

4. In a transmission of the type employing a pair of constantly meshing planetary gear sets connected between an input shaft and an output shaft together with fluid actuated friction devices coacting with said gear sets to establish a reverse drive and at least five forward speed drives, each of said drives being completed by the simultaneous actuation of a different pair of said devices and a first of said devices remaining actuated for the three highest of said forward speed drives, the combination of a hydrodynamic apparatus driven by the input shaft and connected to drive one of the gear sets, a fluid actuated clutch operable to connect the input shaft to drive said one gear set in order to render said hydrodynamic apparatus ineffective, a fluid supply system for supplying fluid to said hydrodynamic apparatus and including valves operable to effect the selective delivery of pressure fluid to said friction devices, and means responsive to the pressure fluid acting upon said first friction device for operating said clutch to render the hydrodynamic device ineffective for all of said three highest speed drives, the pressure fluid for said means and said first friction device being delivered through a common one of said valves.

5. In a transmission of the type employed on motor driven vehicles to provide a plurality of different forward speed ratios, the combination of a plurality of fluid operated devices for establishing the different ratios; means for supplying fluid under pressure to said devices and including pressure varying means for varying the fluid pressure in response to changes in the vacuum in the vehicle engine; a plurality of valves for controlling fluid flow from the supply means to said devices; a main control valve for delivering fluid from the supply means to said plurality of valves in predetermined sequence; a governor responsive to vehicle speed for controlling the operation of said main control valve; means also controlling the operation of said main control valve in response to the varying fluid pressure from the pressure varying means, said control valve being movable from a first position wherein it is effective to direct fluid to said plurality of valves in order to establish a high speed ratio to a second position wherein it is effective to direct fluid to said plurality of valves in order to establish a lower speed ratio; and a kickdown device interposed between the supply means and the main control valve for rendering said main control valve effective to step down the transmission from the high speed ratio to the lower speed ratio in response to depression of the accelerator for the vehicle, said kickdown device including a first pressure regulating valve for regulating the pressure of the fluid supplied to the main control valve when the transmission is in said high speed ratio and a second valve including a plunger movable between first and second positions, said first valve including a piston movable between a regulating position and a non-regulating position and first and second valve chambers exposed to opposed sides of said piston, a first spring biasing said piston toward said non-regulating position, means connecting said first chamber to receive fluid from said main control valve when said main control valve is in its second position and for relieving the fluid pressure in said first chamber when the main control valve is moved to its first position, the fluid pressure in said first chamber cooperating with said first spring to hold said piston in its non-regulating position until said main control valve is moved to its first position, means connecting the second chamber to receive fluid from said second valve when the control valve is in its first position in order to develop a force acting against said first spring to move said piston to its regulating position to supply fluid of reduced pressure to said main control valve, said second valve including a second spring having a length greater than the first spring and biasing said plunger toward its first position, a third valve chamber receiving fluid from said supply means unregulated by the regulating valve to apply a force against said plunger acting in opposition to the second spring, and means responsive to the change in engine vacuum caused by depression of said accelerator when said transmission is in said high speed ratio for causing the pressure varying means to increase the pressure of the fluid supplied to said third chamber in order to overcome said second spring and move the plunger from its first position to its second position, said second valve including means for relieving the fluid pressure in said second chamber when the plunger is in said second position so that said piston is moved by the first spring to its non-regulating position to introduce relatively high pressure fluid to the main control valve whereupon the latter is moved to its second position to step the transmission down from said high speed ratio to said lower speed ratio.

6. In a transmission of the type employed on motor driven vehicles to provide a plurality of different forward speed ratios, the combination of a plurality of fluid operated devices for establishing the different ratios; means for supplying fluid under pressure to said devices, a plurality of valves for controlling fluid flow from the supply means to said devices; a main control valve for delivering fluid from the supply means to said plurality of valves in predetermined sequence; a governor responsive to vehicle speed for controlling the operation of said main control valve, said control valve being movable from a first position wherein it is effective to direct fluid to said plurality of valves in order to establish a high speed ratio to a second position wherein it is effective to direct fluid to said plurality of valves in order to establish a lower speed ratio; and a kickdown device interposed between the supply means and the main control valve for rendering said main control valve effective to step down the transmission from the high speed ratio to the lower speed ratio in response to depression of the accelerator for the vehicle, said kickdown device including a first pressure regulating valve for regulating the pressure of the fluid supplied to the main control valve when the transmission is in said high speed ratio and a second valve including a plunger movable between first and second positions, said first valve including a piston movable between a regulating position and a non-regulating position and first and second valve chambers exposed to opposed sides of said piston, a first spring biasing said piston toward said non-regulating position, means connecting said first chamber to receive fluid from said main control valve when said main control valve is in its second position and for relieving the fluid pressure in said first chamber when the main control valve is moved to its first position, the fluid pressure in said first chamber cooperating with said first spring to hold said piston in its non-regulating position until said main control valve is moved to its first position, means connecting the second chamber to receive fluid from said second valve when the control valve is in its first position in order to develop a force acting against said first spring to move said piston to its regulating position to supply fluid of reduced pressure to said main control valve, said second valve including a second spring biasing said plunger toward its first position, a third valve chamber receiving fluid from said supply means unregulated by the regulating valve to apply a force against said plunger acting in opposition to the second spring, and means responsive to depression of said accelerator when said transmission is in said high speed ratio for increasing the pressure of the fluid supplied to said third chamber in order to overcome said second spring and move the plunger from its first position to its second position, said second valve including means for relieving the fluid pressure in said second chamber when the plunger is in said second position so that said piston is moved by the first spring to its non-regulating position to introuce relatively high pressure fluid to the main control valve whereupon the latter is moved to its second position to step the transmission down from said high speed ratio to said lower speed ratio.

7. In a transmission of the type employed on motor driven vehicles to provide a plurality of different forward speed ratios, the combination of a plurality of fluid operated devices for establishing the different ratios; means for supplying fluid under pressure to said devices; a plurality of valves for controlling fluid flow from the supply means to said devices; a main control valve for delivering fluid from the supply means to said plurality of valves in predetermined sequence; a governor responsive to vehicle speed for controlling the operation of said main control valve, said control valve being movable between a first position wherein it is effective to direct fluid to said plurality of valves in order to establish a high speed and a second position wherein it is effective to direct fluid to said plurality of valves to establish a lower speed ratio; and a kickdown device interposed between the supply means and the main control valve for rendering said main control valve effective to step down the transmission from the high speed ratio to the lower speed ratio in response to depression of the accelerator for the vehicle, said kickdown device including a first valve operable between a regulating position for regulating the pressure of the fluid supplied to the main control valve when the transmission is in said high speed ratio and a non-regulating position for delivering substantially higher pressure to the main control valve, a second valve receiving fluid from the supply means and operable between first and second positions to direct that fluid to said first valve to control the movement of the latter between its regulating and non-regulating positions, means including said second valve when the latter is in its first position for delivering fluid to maintain the first valve in its non-regulating position until the transmission is upshifted to the high speed ratio and, when said second valve is in its second position, for delivering fluid to move the first valve to its regulating position when said high speed ratio is established, and means responsive to depression of said accelerator when said transmission is in said high speed ratio for causing a change in the pressure of the fluid supplied to said second valve in order to move the latter from its second position to its first position whereupon the first valve is moved to its non-regulating position to introduce relatively high pressure fluid to the main control valve in order to move the latter to its second position and step the transmission down from said high speed ratio to said lower speed ratio.

8. In a transmission of the type employed on motor driven vehicles to provide a plurality of different forward speed ratios, the combination of a plurality of fluid operated devices for establishing the different ratios; means for supplying fluid under pressure to said devices and including pressure varying means for varying the pressure of the fluid in response to changes in the vacuum of the vehicle engine; a plurality of valves for controlling fluid flow from the supply means to said devices; a main control valve for delivering fluid from the supply means to said plurality of valves in predetermined sequence; a governor responsive to vehicle speed for controlling the operation of said main control valve, means for delivering fluid from the pressure varying means to the main control valve, said control valve being movable between a first position wherein it is effective to direct fluid to said plurality of valves in order to establish a high speed and a second position wherein it is effective to direct fluid to said plurality of valves to establish a lower speed ratio; and a kickdown device interposed between the supply means and the main control valve for rendering said main control valve effective to step down the transmission from the high speed ratio to the lower speed ratio in response to depression of the accelerator for the vehicle, said kickdown device including a first pressure regulating valve operable between a regulating position for regulating the pressure of the fluid supplied to the main control valve when the transmission is in said high speed ratio and a non-regulating position for delivering substantially higher pressure to the main control valve, a second valve receiving fluid from the pressure varying means and operable between first and second positions to direct that fluid to said first valve to control the movement of the latter between its regulating and non-regulating positions, means including said second valve when the latter is in its first position for delivering fluid to maintain the first valve in its non-regulating position until the transmission is upshifted to the high speed ratio and, when said second valve is in its second position, for delivering fluid to move the first valve to its regulating position when said high speed ratio is established, and means responsive to depression of said accelerator when said transmission is in said high speed ratio for causing said pressure varying means to change the pressure of the fluid supplied to said second valve in order to move the latter from its second position to its first position whereupon the first valve is moved to its non-regulating position to introduce relatively high pressure fluid to the main control valve so that the latter is moved to its second position to step the transmission down from said high speed ratio to said lower speed ratio.

9. In a transmission of the type employed on motor driven vehicles to provide a plurality of different forward speed drive ratios, the combination of a plurality of fluid operated devices for establishing the different ratios; means for supplying fluid under pressure to said devices and including pressure varying means for varying the fluid pressure in response to changes in the vacuum in the vehicle engine, a plurality of valves for controlling fluid flow from the supply means to said devices, a main control valve for delivering fluid from the supply means to said plurality of valves in predetermined sequence; a governor responsive to vehicle speed for controlling the operation of said main control valve, means also controlling the operation of said main control valve in response to the varying fluid pressure from the pressure varying means, said control valve being movable from a first position wherein it is effective to direct fluid to said plurality of valves in order to establish a high speed ratio to a second position wherein it is effective to direct fluid to said plurality of valves in order to establish a lower speed ratio; and a kickdown device interposed between the supply means and the main control valve for rendering said main control valve effective to step down the transmission from the high speed ratio to the lower speed ratio in response to depression of the accelerator for the vehicle, said kickdown device including a first valve for regulating the pressure of the fluid supplied to the main control valve when the transmission is in said high speed ratio and a second valve including a plunger movable between first and second positions, means supplying the varying pressure output of the pressure varying means to said second valve to act upon said plunger, said first valve including a piston movable between a regulating position and a non-regulating position and a first spring biasing said piston toward said non-regulating position, means including said second valve for controlling fluid flow to said first valve to maintain said piston in its regulating position when the plunger is in its first position and for moving the piston to its non-regulating position when the plunger is in its second position, said piston being maintained in its non-regulating position until said main control valve is moved to its first position to establish said high speed ratio, said second valve including a second spring biasing said plunger toward its first position, and means responsive to the change in engine vacuum caused by depression of said accelerator when said transmission is in said high speed ratio for causing the pressure varying means to increase the pressure of the fluid supplied to said second valve in order to overcome said second spring and move the plunger from its first position to its second position so that said piston is moved to its non-regulating position to introduce relatively high pressure fluid to the main control valve whereupon the latter is moved to its second position to step the transmission down from said high speed ratio to said lower speed ratio.

10. In a transmission of the type employed on motor driven vehicles to provide a plurality of different forward speed drive ratios, the combination of a plurality of fluid operated devices for establishing the different ratios; means for supplying fluid under pressure to said devices; a plurality of valves for controlling fluid flow from the supply means to said devices; a main control valve for delivering fluid from the supply means to said plurality of valves in predetermined sequence; a governor responsive to vehicle speed for controlling the operation of said main control valve, said control valve being movable from a first position wherein it is effective to direct fluid to said plurality of valves in order to establish a high speed ratio to a second position wherein it is effective to direct fluid to said plurality of valves in order to establish a lower speed ratio; and a kickdown device interposed between the supply means and the main control valve for rendering said main control valve effective to step down the transmission from the high speed ratio to the lower speed ratio in response to depression of the accelerator for the vehicle, said kickdown device including a first valve for regulating the pressure of the fluid supplied to the main control valve when the transmission is in said high speed ratio, a second valve receiving fluid from the supply means and including a plunger acted upon by that fluid and movable between first and second positions, said first valve including a piston movable between a regulating position and a non-regulating position and a first spring biasing said piston toward said non-regulating position, means including said second valve for controlling fluid flow to said first valve to maintain said piston in its regulating position when the plunger is in its first position and for moving the piston to its non-regulating position to deliver higher fluid pressure to the main control valve when the plunger is in its second position, said piston being maintained in its non-regulating position until said main control valve is moved to its first position to establish said high speed ratio, said second valve including a second spring biasing said plunger toward its first position, means responsive to depression of said accelerator when said transmission is in said high speed ratio for changing the pressure of the fluid supplied to said second valve in order to move the plunger from its first position to its second position so that said piston is moved to its non-regulating position to introduce relatively high pressure fluid to the main control valve and means in the control valve responsive to said relatively high pressure fluid to operate the main control valve to its second position in order to step the transmission down from said high speed ratio to said lower speed ratio.

11. In a motor vehicle transmission of the type including change speed gearing for providing five different forward speed drive ratios and a reverse drive between an input shaft and an output shaft, the combination of five fluid operated devices operable in different pairs to establish the different ratios through the change speed gearing, means for supplying fluid under pressure to said devices and including pressure varying means for varying the pressure of the fluid from said supply means in response to changes in the vacuum of the vehicle engine, a manually operable selector valve movable between a neutral position, a reverse position and first, second, third, fourth and fifth forward drive positions, a plurality of valves for controlling fluid flow from the supply means to said devices and including a reverse valve, and first, second, third and fourth shift valves, a main control valve for delivering fluid from the supply means to said plurality of valves in predetermined sequence, a governor responsive to vehicle speed for controlling the operation of said main control valve, means also controlling the operation of said main control valve in response to the varying pressure so that said control valve is jointly responsive to the speed of the vehicle and to the engine vacuum, said main control valve including means for successively connecting a first series of ports to vent and means for successively supplying a second series of ports with fluid under pressure from the supply means, each of said shift valves including first and second pistons spaced apart to define an operating chamber and mounted within a valve bore having first and second valve operating chambers at its opposed ends, a biasing spring interposed between the first and second pistons of each shift valve, means for supplying fluid from the supply means directly to a first pair of said control devices when said selector valve is in the first forward position, means for delivering fluid from the supply means through the selector valve and through the reverse valve to a second pair of said control devices when said selector valve is in its reverse position, means for supplying fluid from said selector valve to the first chambers of said first, second, third and fourth shift valves when the selector valve is in said second, third, fourth and fifth positions, respectively, means respectively connecting the different ports of the first series to the second chambers of the shift valves so that, when the second chamber of each valve is connected to vent, the fluid pressure in the first chamber of that valve becomes effective to move the valve pistons jointly toward the second chamber to deliver fluid to the proper pair of control devices for effecting the shift from one speed ratio to another, whereby the selector valve may be manually shifted through its five forward positions to shift the transmission when the control valve is properly positioned by the speed of the vehicle and the engine vacuum, means respectively connecting the ports of the second series to the operating chambers of said shift valves so that as the second series of ports is successively supplied with fluid under pressure the first pistons of the shift valves are returned towards the first chamber by the biasing springs while the second piston of each shift valve is maintained in the second chamber, thereby to prevent inadvertent movement of the second piston until the speed and engine vacuum conditions affecting the main control valve are such that the main control valve becomes effective to discontinue the delivery of fluid pressure to the operating chamber.

12. In a motor vehicle transmission of the type including change speed gearing for providing five different forward speed drive ratios and a reverse drive between an input shaft and an output shaft, the combination of five fluid operated devices operable in different pairs to establish the different ratios through the change speed gearing, means for supplying fluid under pressure to said devices and including pressure varying means for varying the pressure of the fluid from said supply means in response to changes in at least one vehicle condition, a manually operable selector valve movable between a neutral position, a reverse position and first, second, third, fourth and fifth forward drive positions, a plurality of valves for controlling fluid flow from the supply means to said devices and including a reverse valve, and first, second, third and fourth shift valves, a main control valve for delivering fluid from the supply means to said plurality of valves in predetermined sequence, a governor responsive to vehicle speed for controlling the operation of said main control valve, means also controlling the operation of said main control valve in response to the varying pressure so that said control valve is jointly responsive to the speed of the vehicle and to said one vehicle condition, said main control valve including means for successively connecting a first series of ports to vent and means for successively supplying a second series of ports with fluid under pressure from the supply means, each of said shift valves including first and second pistons spaced apart to define an operating chamber and mounted within a valve bore having first and second valve operating chambers at its opposed ends, a biasing spring interposed between the first and second pistons of each shift valve, means for supplying fluid from the supply means directly to a first pair of said control devices when selector valve is in the first forward position, means for delivering fluid from the supply means through the selector valve and through the reverse valve to a second pair of said control devices when said selector valve is in its reverse position, means for supplying fluid from said selector valve to the first chambers of said first, second, third and fourth shift valves when the selector valve is in said second, third, fourth, and fifth positions, respectively, means respectively connecting the different ports of the first series to the second chambers of the shift valves so that when the second chamber of each valve is connected to vent the fluid pressure in the first chamber of that valve becomes effective to move the valve pistons jointly toward the second chamber to deliver fluid to the proper pair of control devices for effecting the shift from one speed ratio to another, whereby the selector valve may be manually shifted through its five forward positions to shift the transmission when the control valve is properly positioned by the speed of the vehicle and said one vehicle condition, means respectively connecting the ports of the second series to the operating chambers of said shift valves so that as the second series of ports is successively supplied with fluid under pressure the first pistons of the shift valves are returned towards the first chamber by the biasing springs while the second piston of each shift valve is maintained in the second chamber, thereby to prevent inadvertent movement of the second piston until the conditions affecting the main control valve are such that the main control valve becomes effective to discontinue the delivery of fluid pressure to the operating chamber.

13. In a motor vehicle transmission of the type including change speed gearing for providing a plurality of different forward speed drive ratios and a reverse drive between an input shaft and an output shaft, the combination of a plurality of fluid operated devices operable in different pairs to establish the different ratios through the change speed gearing, means for supplying fluid under pressure to said devices and including pressure varying means for varying the pressure of the fluid from said supply means in response to changes in the vacuum of the vehicle engine, a manually operable selector valve movable between a neutral position, a reverse position and at least one forward drive position, a plurality of valves for controlling fluid flow from the supply means to said devices and including a reverse valve, and a group of shift valves, a main control valve for delivering fluid from the supply means to said plurality of valves in predetermined sequence, a governor responsive to vehicle speed for controlling the operation of said main control valve, means also controlling the operation of said main control valve in response to the varying pressure so that said control valve is jointly responsive to the speed of the vehicle and to the engine vacuum, said main control valve including means for successively connecting a first series of ports to vent and means for successively supplying a second series of ports with fluid under pressure from the supply means, each of said shift valves including first and second pistons spaced apart to define an operating chamber and mounted within a valve bore having first and second valve operating chambers at its opposed ends, a biasing spring interposed between the first and second pistons of each shift valve, means for delivering fluid from the supply means through the selector valve and through the reverse valve to a first pair of said control device when said selector valve is in its reverse position, means for supplying fluid from said selector valve to the first chamber of said shift valves when the selector valve is in said forward drive position, means respectively connecting the different ports of the first series to the second chambers of the shift valves so that when the second chamber of each valve is connected to vent the fluid pressure in the first chamber of that valve becomes effective to move the valve pistons jointly toward the second chamber to deliver fluid to the proper pair of control devices for effecting the shift from one speed ratio to another, means respectively connecting the ports of the second series to the operating chambers of said shift valves so that as the second series of ports is successively supplied with fluid under pressure the first pistons of the shift valves are returned towards the first chamber by the biasing springs while the second piston of each shift valve is maintained in the second chamber, thereby to prevent inadvertent movement of the second piston until the speed and engine vacuum conditions affecting the main control valve are such that the main control valve becomes effective to discontinue the delivery of fluid pressure to the operating chamber.

14. In a motor vehicle transmission of the type including change speed gearing for providing a plurality of different forward speed drive ratios between an input shaft and an output shaft, the combination of a plurality of fluid operated devices operable in different pairs to establish the different ratios through the change speed gearing, means for supplying fluid under pressure to said devices and including pressure varying means for varying the pressure of the fluid from said supply means in response to changes in at least one vehicle condition, a manually operable selector valve movable between a neutral position and at least one forward drive position, means including a plurality of shift valves for controlling fluid flow from the supply means to said devices, a main control valve for delivering fluid from the supply means to said plurality of valves in predetermined sequence, a governor responsive to vehicle speed for controlling the operation of said main control valve, means also controlling the operation of said main control valve in response to the varying pressure so that said control valve is jointly responsive to the speed of the vehicle and to said one vehicle condition, said main control valve including means for successively connecting a first series of ports to vent and means for successively supplying a second series of ports with fluid under pressure from the supply means, each of said shift valves including first and second pistons spaced apart to define an operating chamber and mounted within a valve bore having first and second valve operating chambers at its opposed ends, a biasing spring interposed between the first and second pistons of each shift valve, means for supplying fluid from said selector valve to the first chamber of said shift valves when the selector valve is in said forward drive position, means respectively connecting the different ports of the first series to the second chambers of the shift valves so that when the second chamber of each valve is connected to vent the fluid pressure in the first chamber of that valve becomes effective to move the valve pistons jointly toward the second chamber to deliver fluid to the proper pair of control devices for effecting the shift from one speed ratio to another, means respectively connecting the ports of the second series to the operating chambers of said shift valves so that as the second series of ports is successively supplied with fluid under pressure the first pistons of the shift valves are returned towards the first chamber by the biasing springs while the second piston of each shift valve is maintained in the second chamber, thereby to prevent inadvertent movement of the second piston until the conditions affecting the main control valve are such that the main control valve becomes effective to discontinue the delivery of fluid pressure to the operating chamber.

15. In a motor vehicle transmission of the type including change speed gearing for providing a plurality of forward speed drive ratios between an input shaft and an output shaft, the combination of a plurality of fluid operated devices selectively operable to establish the different ratios through the change speed gearing, means for supplying fluid under pressure to said devices and including pressure varying means for varying the pressure of the fluid from said supply means in response to changes in the vacuum of the vehicle engine, a manually operable selector valve movable between a neutral position and at least one forward drive position means including at least one shift valve for controlling fluid flow from the supply means to said devices, means for delivering fluid from the supply means to said shift valve to control the upshift or downshift of the transmission and including valving responsive to vehicle speed and to the varying pressure, said shift valve including first and second pistons spaced apart to define an operating chamber and mounted within a valve bore having first and second valve operating chambers at its opposed ends, a biasing spring interposed between the first and second pistons of the shift valve, means for supplying fluid from said selector valve to the first chamber of said shift valve when the selector valve is in said forward drive position, means including said valving for controlling fluid flow from the supply means to the second chamber of the shift valve so that when the fluid pressure in the second chamber is relieved the fluid pressure in the first chamber becomes effective to move the valve pistons jointly toward the second chamber to deliver fluid to the proper pair of control devices for effecting the shift from one speed ratio to another, means including the valving for controlling fluid flow from the supply means to the operating chamber of said shift valve in order to supply fluid pressure to balance the fluid pressure in the first chamber and to permit the first piston to be returned towards the first chamber by the biasing spring while the second piston is maintained in the second chamber, thereby to prevent inadvertent movement of the second piston until the speed and engine vacuum conditions affecting the valving are such that the valving becomes effective to discontinue the delivery of fluid pressure to the operating chamber.

16. In a motor vehicle transmission of the type including change speed gearing for providing a plurality of forward speed drive ratios between an input shaft and an output shaft, the combination of a plurality of fluid operated devices selectively operable to establish the different ratios through the change speed gearing, means for supplying fluid under pressure to said devices and including pressure varying means for varying the pressure of the fluid from said supply means in response to changes in at least one vehicle condition, a manually operable selector valve movable between a neutral position and at least one forward drive position, means including at least one shift valve for controlling fluid flow from the supply means to said devices, means for delivering fluid from the supply means to said shift valve to control the upshift or downshift of the transmission and including valving jointly responsive to vehicle speed and to the varying pressure, said shift valve including first and second pistons spaced apart to define an operating chamber and movable between upshift and downshift positions, means for supplying fluid from said selector valve to the shift valve to develop a force acting to move the pistons to their upshift position when the selector valve is in said forward drive position, means including the valving for controlling fluid flow from the supply means to the operating chamber of said shift valve and for returning the first piston to its downshift position while maintaining the second piston in its upshift position, thereby to prevent inadvertent movement of the second piston from its upshift position until the conditions affecting the valving are such that the valving becomes effective to discontinue the delivery of fluid pressure to the operating chamber.

17. In a motor vehicle transmission of the type including change speed gearing for providing a plurality of forward speed drive ratios between an input shaft and an output shaft, the combination of a plurality of fluid operated devices selectively operable to establish the different ratios through the change speed gearing, means for supplying fluid under pressure to said devices and including pressure varying means for varying the pressure of the fluid from said supply means in response to changes in at least one vehicle condition, a manually operable selector valve movable between a neutral position and at least one forward drive position, means including at least one shift valve for controlling fluid flow from the supply means to said devices, means for delivering fluid from the supply means to said shift valve to control the upshift or downshift of the transmission and including valving jointly responsive to vehicle speed and to the varying pressure, said shift valve including first and second pistons spaced apart to define an operating chamber and mounted for movement between downshift and upshift positions within a valve bore having first and second valve operating chambers at its opposed ends, a biasing spring interposed between the first and second pistons of the shift valve, means for supplying fluid from said selector valve to the first chamber of said shift valve when the selector valve is in said forward drive position in order to move the valve pistons jointly to their upshift positions, thereby to deliver fluid to the proper pair of control devices for effecting an upshift from one speed ratio to another, means including the valving for controlling fluid flow from the supply means to the operating chamber of said shift valve in order to supply fluid pressure to balance the fluid pressure in the first chamber and to permit the first piston to be returned to its downshift position by the biasing spring while the second piston is maintained in its upshift position, thereby to prevent inadvertent movement of the second piston until the conditions affecting the valving are such that the valving becomes effective to discontinue the delivery of fluid pressure to the operating chamber.

References Cited in the file of this patent
UNITED STATES PATENTS

| | | |
|---|---|---|
| 2,732,732 | Borman | Jan. 31, 1956 |
| 2,738,689 | Dodge | Mar. 20, 1956 |
| 2,815,684 | Roche | Dec. 10, 1957 |

UNITED STATES PATENT OFFICE
CERTIFICATION OF CORRECTION

Patent No. 3,025,723                                        March 20, 1962

James A. Miller

It is hereby certified that error appears in the above numbered patent requiring correction and that the said Letters Patent should read as corrected below.

Column 2, line 62, for "pistons" read -- pinions --; column 5, line 64, for "by" read -- from --; column 6, line 27, for "the", second occurrence, read -- line --; column 7, line 62, for "and" read -- end --; column 8, line 4, after "through" second occurrence, insert -- a bypass passage 126a around --; line 5, strike out "a by-pass passage 126a around"; line 52, for "transmision" read -- transmission --; column 10, line 9, for "saft" read -- shaft --; column 11, line 28, for "fuly" rea -- fully --; column 11, line 45, for "uper" read -- upper --; column 17, lines 32 and 33, for "connetced" read -- connected - column 21, line 61, for "introuce" read -- introduce --.

Signed and sealed this 9th day of October 1962.

(SEAL)
Attest:

ERNEST W. SWIDER                                        DAVID L. LADD

Attesting Officer                                             Commissioner of Patents